(12) United States Patent
Rached

(10) Patent No.: US 10,450,489 B2
(45) Date of Patent: Oct. 22, 2019

(54) HEAT-TRANSFER FLUID FOR A CENTRIFUGAL COMPRESSOR

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 158 days.

(21) Appl. No.: 15/343,664

(22) Filed: Nov. 4, 2016

(65) Prior Publication Data

US 2018/0079943 A1 Mar. 22, 2018

Related U.S. Application Data

(63) Continuation of application No. 13/574,261, filed as application No. PCT/FR2011/050401 on Feb. 28, 2011, now Pat. No. 9,574,124.

(30) Foreign Application Priority Data

Mar. 2, 2010 (FR) ..................................... 10 51503

(51) Int. Cl.
| | | |
|---|---|---|
| C09K 5/04 | (2006.01) | |
| F25B 45/00 | (2006.01) | |
| F25B 1/053 | (2006.01) | |
| F25B 31/02 | (2006.01) | |

(52) U.S. Cl.
CPC .............. *C09K 5/045* (2013.01); *F25B 1/053* (2013.01); *F25B 31/026* (2013.01); *F25B 45/00* (2013.01); *C09K 2205/122* (2013.01); *C09K 2205/126* (2013.01); *C09K 2205/22* (2013.01); *C09K 2205/40* (2013.01); *F25B 2400/07* (2013.01); *F25B 2400/121* (2013.01)

(58) Field of Classification Search
CPC ............... F25B 45/00; F25B 2400/121; C09K 2205/40; C09K 2205/112; C09K 2205/22; C09K 2205/126
See application file for complete search history.

(56) References Cited

U.S. PATENT DOCUMENTS

| | | |
|---|---|---|
| 5,076,064 A | 12/1991 | Konko |
| 5,363,674 A | 11/1994 | Powell |
| 6,248,255 B1 | 6/2001 | Pearson |
| 6,991,743 B2 | 1/2006 | Poole et al. |
| 8,070,977 B2 | 12/2011 | Rached |
| 8,075,798 B2 | 12/2011 | Rached |
| 8,951,432 B2 | 2/2015 | Boutier et al. |
| 9,005,468 B2 | 4/2015 | Rached |
| 9,315,706 B2 | 4/2016 | Boussand |
| 9,512,343 B2 | 12/2016 | Rached et al. |
| 9,574,124 B2 | 2/2017 | Rached |
| 9,683,154 B2 | 6/2017 | Rached |
| 10,029,963 B2 | 7/2018 | Bonnet et al. |
| 10,119,056 B2 | 11/2018 | Rached et al. |
| 2004/0089839 A1 | 5/2004 | Thomas et al. |
| 2005/0245421 A1 | 11/2005 | Singh et al. |
| 2006/0243944 A1 | 11/2006 | Minor et al. |
| 2007/0069175 A1 | 3/2007 | Thomas et al. |
| 2008/0111099 A1 | 5/2008 | Singh et al. |
| 2008/0184731 A1 | 8/2008 | Sienel et al. |
| 2008/0230738 A1 | 9/2008 | Minor |
| 2008/0314073 A1 | 12/2008 | Minor |
| 2009/0120619 A1 | 5/2009 | Sievert et al. |
| 2009/0158771 A1 | 6/2009 | Low et al. |
| 2009/0241562 A1 | 10/2009 | Thomas et al. |
| 2009/0272931 A1 | 11/2009 | Minor |
| 2009/0314015 A1 | 12/2009 | Minor et al. |
| 2010/0038583 A1 | 2/2010 | Shimomura |
| 2010/0044619 A1 | 2/2010 | Hulse et al. |
| 2010/0108936 A1 | 5/2010 | Kaneko |
| 2010/0133463 A1 | 6/2010 | Kaneko |
| 2010/0186432 A1 | 7/2010 | Perti et al. |
| 2010/0319377 A1 | 12/2010 | Moriwaki et al. |
| 2010/0326129 A1 | 12/2010 | Moriwaki et al. |
| 2011/0011124 A1 | 1/2011 | Matsuura et al. |
| 2011/0258147 A1 | 10/2011 | Low |
| 2012/0068104 A1 | 3/2012 | Rached et al. |
| 2012/0068105 A1 | 3/2012 | Rached et al. |
| 2012/0097885 A9 | 4/2012 | Hulse et al. |
| 2012/0126187 A1 | 5/2012 | Low |
| 2012/0292556 A1 | 11/2012 | Van Horn |
| 2013/0055733 A1 | 3/2013 | Rached |
| 2013/0055739 A1 | 3/2013 | Rached |
| 2013/0061613 A1 | 3/2013 | Rached |
| 2013/0299733 A1 | 11/2013 | Boussand |

(Continued)

FOREIGN PATENT DOCUMENTS

| | | |
|---|---|---|
| EP | 2 149 592 A2 | 2/2010 |
| JP | 4-110388 | 4/1992 |

(Continued)

OTHER PUBLICATIONS

Rudnick, Leslie R. and Shubkin, Ronald L., Editors, Synthetic Lubricants and High-Performance Functional Fluids, 2$^{nd}$ Ed, "25, Refrigeration Lubes", 1999, 46 pages, Marcel Dekker, Inc., NY, NY.

(Continued)

*Primary Examiner* — Cassey D Bauer
(74) *Attorney, Agent, or Firm* — Buchanan Ingersoll & Rooney P.C.

(57) ABSTRACT

A process for cooling or heating a fluid or a body by means of a vapor compression circuit including a centrifugal compressor and containing a heat-transfer fluid, the heat-transfer fluid including at least two compounds selected from 2,3,3,3-tetrafluoropropene, 1,3,3,3-tetrafluoropropene, 1,1,1,2-tetrafluoropropene, 1,1-difluoroethane and 3,3,3-trifluoropropene, in which: the ratio of the Mach number of the centrifugal compressor to the Mach number which the centrifugal compressor has under the same operating conditions if the heat-transfer fluid is replaced with 1,1,1,2-tetrafluoroethane in the vapor compression circuit is greater than or equal to 0.97 and less than or equal to 1.03; the compression ratio of the centrifugal compressor is less than or equal to the compression ratio which the centrifugal compressor has under the same operating conditions if the heat-transfer fluid is replaced with 1,1,12-tetrafluorethane in the vapor compression circuit.

14 Claims, No Drawings

(56) References Cited

U.S. PATENT DOCUMENTS

| | | |
|---|---|---|
| 2014/0110623 A1 | 4/2014 | Boutier et al. |
| 2015/0184051 A1 | 7/2015 | Rached |
| 2016/0031773 A1 | 2/2016 | Bonnet et al. |
| 2016/0032165 A1 | 2/2016 | Boussand |
| 2017/0037291 A1 | 2/2017 | Rached et al. |
| 2018/0312453 A1 | 11/2018 | Bonnet et al. |
| 2019/0023956 A1 | 1/2019 | Rached et al. |

FOREIGN PATENT DOCUMENTS

| | | |
|---|---|---|
| JP | 2007-538115 A1 | 12/2007 |
| JP | 2008-531836 A | 8/2008 |
| JP | 2008-544072 A1 | 12/2008 |
| JP | 2009-222362 A1 | 10/2009 |
| JP | 2010-047754 A | 3/2010 |
| JP | 2012-524137 A1 | 10/2012 |
| WO | WO 97/17414 A1 | 5/1997 |
| WO | WO 2004/037913 A2 | 5/2004 |
| WO | WO 2005/108522 A1 | 11/2005 |
| WO | WO 2006/094303 A2 | 9/2006 |
| WO | WO 2006/094303 A3 | 9/2006 |
| WO | WO 2007/002625 A2 | 1/2007 |
| WO | WO 2007/002625 A3 | 1/2007 |
| WO | WO 2007/053697 A2 | 5/2007 |
| WO | WO 2007/126414 A2 | 11/2007 |
| WO | WO 2008/053951 A1 | 5/2008 |
| WO | WO 2008/130026 A1 | 10/2008 |
| WO | WO 2009/018117 A1 | 2/2009 |
| WO | WO 2009/047535 A2 | 4/2009 |
| WO | WO 2009/047535 A3 | 4/2009 |
| WO | WO 2009/107364 A1 | 9/2009 |
| WO | WO 2009/110228 A1 | 9/2009 |
| WO | WO 2009/114398 A1 | 9/2009 |
| WO | WO 2009/116282 A1 | 9/2009 |
| WO | WO 2009/150763 A1 | 12/2009 |
| WO | WO 2009/151669 A1 | 12/2009 |
| WO | WO 2010/000993 A2 | 1/2010 |
| WO | WO 2010/000993 A3 | 1/2010 |
| WO | WO 2010/000994 A2 | 1/2010 |
| WO | WO 2010/000994 A3 | 1/2010 |
| WO | WO 2010/002020 A1 | 1/2010 |
| WO | WO 2010/022018 A2 | 2/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/119265 A1 | 10/2010 |
| WO | WO 2011/023923 A1 | 3/2011 |
| WO | WO 2011/082003 A1 | 7/2011 |
| WO | WO 2011/101608 A1 | 8/2011 |
| WO | WO 2011/101621 A2 | 8/2011 |
| WO | WO 2011/101621 A3 | 8/2011 |

OTHER PUBLICATIONS

Kontomaris, K., et al., Low GWP Refrigerants for Centrifugal Chillers, ASHRAE Annual Conference, Jun. 20-24, 2009, Louisville, Kentucky, DuPont Fluoroproducts.

Taira, S., et al., Examination Regarding Air Conditioning and Heat Pump Water Heater System Using Post New Alternative Regrigerant, International Symposium on Next-Generation Air Conditioning and Refrigeration Technology, Feb. 17-19, 201.

Brasz, J.J., Variable-Speed Centrifugal Compressor Behaviour With Low GWP Refrigerants, International Conference on Compressors and Their Systems, Sep. 7, 2009, London.

Official Action issued by the European Patent Office in EP Appln. No. 11 731 422.9, Sep. 4, 2013, 4 pages, European patent Office.

International search Report (English translation) issued in International Patent Application No. PCT/FR2011/050401, Sep. 26, 2011, 4 pages, European Patent Office, Rijswijk, NL.

Notification of Reasons for Refusal issued by the Japanese Patent Office in JP Patent Appln. No. 2015-246978, dated Dec. 7, 2016, 26 pages (JPOA-15 pages, Eng Trans-11 pages).

U.S. Appl. No. 13/697,027, Wissam Rached, filed Nov. 9, 2012 (Cited herein as U.S. Pat. No. 2013/0055739 A1 of Mar. 7, 2013).

U.S. Appl. No. 13/232,106, Wissam Rached, filed Sep. 14, 2011 (Cited herein as U.S. Pat. No. 2012/0068104 A1 of Mar. 22, 2012).

U.S. Appl. No. 14/645,031, Wissam Rached, filed Mar. 11, 2015 (Cited herein as U.S. Pat. No. 2015/0184051 A1 of Jul. 2, 2015).

U.S. Appl. No. 14/773,961, Phillippe Bonnet, filed Sep. 9, 2015 (Cited herein as U.S. Pat. No. 2016/0031773 A1 of Feb. 4, 2016).

U.S. Appl. No. 14/880,605, Béatrice Boussand, filed Oct. 12, 2015 (Cited herein as U.S. Pat. No. 2016/0032165 A1 of Feb. 4, 2016).

U.S. Appl. No. 15/297,569, Wissam Rached, filed Oct. 19, 2016 (Cited herein as U.S. Pat. No. 2017/0037291 A1 of Feb. 9, 2017).

**Rached, Wissam, et al., U.S. Appl. No. 16/143,505 entitled "Composition Based on 1,3,3,3-Tetrafluoropropene," filed in the U.S. Patent and Trademark Office on Sep. 27, 2018.

Excerpt from "Thermophysical Properties Handbook," Mar. 25, 2008, 4 pages including Front Matter pages, pp. 645-646, ISBN978-4-8425-0426-1 C3053, Yokendo Co. Ltd., Tokyo, Japan, Textbook pages in Japanese with partial English-language translation.

Higashi, Yukihiro, Thermophysical Properties of HFO-1234yf and HFO-1234ze(E), 2010 International Symposium on Next-generation Air Conditioning and Refrigeration Technology, Feb. 17-19, 2010, Tokyo, JP, 9 pages.

Yamada, Yasufu, et al., "Environmentally friendly non-flammable refrigerants," 2010 International Symposium on Next-generation Air Conditioning and Refrigeration Technology, Feb. 17-19, 2010, Tokyo, JP, 8 pages.

Aoi, Tatsufumi, et al., "Verification of Reliability for Variable Speed Motor Drive System of Compressor," *Mitsubishi Heavy Industries, Ltd., Technical Review*, pp. 150-153, vol. 41, No. 3 (2004-5), 8 pages (including English-language translation).

U.S. Appl. No. 16/382,640, Wissam Rached, filed Apr. 12, 2019.

**Rached, Wissam, U.S. Appl. No. 16/382,640 entitled "Heat-Transfer Fluids and use Thereof in Countercurrent Heat Exchangers," filed in the U.S. Patent and Trademark Office on Apr. 12, 2019.

U.S. Appl. No. 16/029,078, Phillippe Bonnet, Betrand Collier, Dominique Deur-Bert and Laurent Wendlinger, filed Jul. 6, 2018 (Cited herein as U.S. Pat. No. 2018/0312453 A1 of Nov. 1, 2018).

U.S. Appl. No. 16/143,505, Wissam Rached and Béatrice Boussand, filed Sep. 27, 2018.

HEAT-TRANSFER FLUID FOR A CENTRIFUGAL COMPRESSOR

CROSS REFERENCE TO RELATED APPLICATIONS

The present application is a divisional of U.S. application Ser. No. 13/574,261, filed on Jul. 20, 2012, which is a U.S. national stage application of International Application No. PCT/FR2011/050401, filed on Feb. 28, 2011, which claims the benefit of French Application No. 10.51503, filed on Mar. 2, 2010. The entire contents of each of U.S. application Ser. No. 13/574,261, International Application No. PCT/FR2011/050401, French Application No. 10.51503 are hereby incorporated herein by reference in their entirety.

TECHNICAL FIELD

The present invention relates to heat transfer fluids suitable for use in vapor compression systems comprising a centrifugal compressor, in particular as a replacement for 1,1,1,2-tetrafluoroethane (HFC-134a).

TECHNICAL BACKGROUND

Fluids based on fluorocarbon compounds are widely used in many industrial devices, in particular air conditioning, heat pump or refrigeration devices. These devices have in common the fact that they are based on a thermodynamic cycle comprising the vaporization of the fluid at low pressure (in which the fluid absorbs heat); the compression of the vaporized fluid to a high pressure; the condensation of the vaporized fluid to liquid at high pressure (in which the fluid releases heat); and the expansion of the fluid in order to complete the cycle.

The compression step is carried out using a compressor, which may be, in particular, a centrifugal compressor.

The choice of a heat transfer fluid (which may be a pure compound or a mixture of compounds) is dictated, on the one hand, by the thermodynamic properties of the fluid and, on the other hand, by additional constraints, and in particular environmental constraints.

It is in this way that chlorinated compounds (chlorofluorocarbons and hydrochlorofluorocarbons) have the disadvantage of damaging the ozone layer. Henceforth, generally non-chlorinated compounds such as hydrofluorocarbons are therefore preferred to them.

In particular, many air conditioning systems currently operate with HFC-134a as heat transfer fluid. However, HFC-134a has a global warming potential (GWP) which is too high. It is therefore desirable to replace HFC-134a with another heat transfer fluid having a lower GWP.

However, any modification of the heat transfer fluid may pose problems in adapting the vapor compression cycle system. In particular, when the cycle uses a centrifugal compressor, the replacement of the heat transfer fluid may require a change of the centrifugal compressor itself or at the very least a modification of the operating parameters of the compressor liable to degrade the efficiency of the system or to accelerate wear phenomena.

Documents WO 97/17414 and U.S. Pat. No. 6,991,743 propose the replacement of dichlorodifluoromethane (CFC-12) with compositions comprising HFC-134a in cycles comprising a centrifugal compressor. The choice of substitute compositions is mainly made as a function of the molecular weight. However, the molecular weight is not in fact sufficiently predictive of the behavior of the various heat transfer fluids.

Document U.S. Pat. No. 5,076,064 proposes the replacement of trichlorofluoromethane (CFC-11) with compositions comprising, in particular, 1,1-dichloro-2,2,2-trifluoroethane (CFC-123) in cycles comprising a centrifugal compressor. The choice of the substitute compositions is mainly made as a function of the Mach number.

Documents WO 2005/108522 and WO 2007/126414 disclose mixtures of fluoroolefins and of other heat transfer compounds as heat transfer fluids. However, these documents do not identify any composition specifically suitable for a vapor compression system comprising a centrifugal compressor.

Document WO 2007/053697 also describes compositions based on fluoroolefins intended to be used as heat transfer fluids. Example 7 describes compounds suitable for replacing 1,2,2-trichlorofluoroethane (CFC-113) in cycles provided with a centrifugal compressor. The choice of the compounds is based on a calculation of theoretical rotational speed of the blades of the compressor. The approximations used in this calculation are however reserved for relatively heavy fluids.

Document WO 2009/018117 describes mixtures of fluoroolefins and of other heat transfer compounds as heat transfer fluids, especially as a replacement for HFC-134a. However, this document does not identify any composition specifically suitable for a vapor compression system comprising a centrifugal compressor.

Document WO 2009/151669 describes various heat transfer compositions based on specific lubricants and fluoroolefins.

None of the documents of the prior art proposes a heat transfer fluid as a replacement for HFC-134a in a vapor compression system comprising a centrifugal compressor, which both has a GWP below that of HFC-134a and guarantees the maintenance or even an improvement of the performances of the centrifugal compressor relative to HFC-134a.

There is therefore a real need to develop such a heat transfer fluid.

SUMMARY

The invention firstly relates to a process for cooling or heating a fluid or a body by means of a vapor compression circuit comprising a centrifugal compressor and containing a heat transfer fluid, the heat transfer fluid comprising at least two compounds chosen from 2,3,3,3-tetrafluoropropene, 1,3,3,3-tetrafluoropropene, 1,1,1,2-tetrafluoroethane, 1,1-difluoroethane and 3,3,3-trifluoropropene, wherein:
  the ratio of the Mach number of the centrifugal compressor to the Mach number that the centrifugal compressor has, under the same operating conditions, when the heat transfer fluid is replaced by 1,1,1,2-tetrafluoroethane in the vapor compression circuit, is greater than or equal to 0.97 and less than or equal to 1.03;
  the compression ratio of the centrifugal compressor is less than or equal to the compression ratio that the centrifugal compressor has, under the same operating conditions, when the heat transfer fluid is replaced by 1,1,1,2-tetrafluoroethane in the vapor compression circuit.

The invention furthermore relates to an installation for cooling or heating a fluid or a body, for the implementation of the above process, comprising a vapor compression circuit comprising a centrifugal compressor and containing a heat transfer fluid, the heat transfer fluid comprising at least two compounds chosen from 2,3,3,3-tetrafluoropropene, 1,3,3,3-tetrafluoropropene, 1,1,1,2-tetrafluoroethane, 1,1-difluoroethane and 3,3,3-trifluoropropene (and mixtures thereof), wherein:

the ratio of the Mach number of the centrifugal compressor to the Mach number that the centrifugal compressor has, under the same operating conditions, when the heat transfer fluid is replaced by 1,1,1,2-tetrafluoroethane in the vapor compression circuit, is greater than or equal to 0.97 and less than or equal to 1.03;

the compression ratio of the centrifugal compressor is less than or equal to the compression ratio that the centrifugal compressor has, under the same operating conditions, when the heat transfer fluid is replaced by 1,1,1,2-tetrafluoroethane in the vapor compression circuit.

The invention furthermore relates to a process for converting a vapor compression circuit, which consists in replacing an existing heat transfer fluid with the above heat transfer fluid.

This process comprises:

the provision of an initial vapor compression circuit comprising a centrifugal compressor and containing 1,1,1,2-tetrafluoroethane as heat transfer fluid; and the replacement of the 1,1,1,2-tetrafluoroethane with a substitute heat transfer fluid in order to provide a final vapor compression circuit;

wherein the substitute heat transfer fluid comprises at least two compounds chosen from 2,3,3,3-tetrafluoropropene, 1,3,3,3-tetrafluoropropene, 1,1,1,2-tetrafluoroethane, 1,1-difluoroethane and 3,3,3-trifluoropropene (and mixtures thereof), and wherein:

the ratio of the Mach number of the centrifugal compressor in the final vapor compression circuit to the Mach number of the centrifugal compressor in the initial vapor compression circuit, under the same operating conditions, is greater than or equal to 0.97 and less than or equal to 1.03; and the compression ratio of the centrifugal compressor in the final vapor compression circuit is less than or equal to the compression ratio of the centrifugal compressor in the initial vapor compression circuit, under the same operating conditions.

According to one embodiment of the cooling or heating process, of the cooling or heating installation and of the process for converting a vapor compression circuit above, the heat transfer fluid (where appropriate the substitute heat transfer fluid) comprises, preferably consists of, a mixture:

of 2,3,3,3-tetrafluoropropene and of 1,1,1,2-tetrafluoroethane; or of 2,3,3,3-tetrafluoropropene and of 1,1-difluoroethane; or of 2,3,3,3-tetrafluoropropene and of 3,3,3-trifluoropropene; or of 1,3,3,3-tetrafluoropropene and of 3,3,3-trifluoropropene; or of 1,1,1,2-tetrafluoroethane and of 3,3,3-trifluoropropene; or of 2,3,3,3-tetrafluoropropene, of 1,3,3,3-tetrafluoropropene and of 1,1-difluoroethane;

of 2,3,3,3-tetrafluoropropene, of 1,1,1,2-tetrafluoroethane and of 1,1-difluoroethane; or of 2,3,3,3-tetrafluoropropene, of 1,1,1,2-tetrafluoroethane and of 3,3,3-trifluoropropene; or of 2,3,3,3-tetrafluoropropene, of 1,1-difluoroethane and of 3,3,3-trifluoropropene; or of 1,3,3,3-tetrafluoropropene, of 1,1,1,2-tetrafluoroethane and of 1,1-difluoroethane; or of 1,3,3,3-tetrafluoropropene, of 1,1-difluoroethane and of 3,3,3-trifluoropropene.

According to another embodiment of the cooling or heating process and of the cooling or heating installation above, the vapor compression circuit comprises an evaporator and a condenser, and:

the difference between the pressure at the condenser and the pressure at the evaporator is less than or equal to the difference between the pressure at the condenser and the pressure at the evaporator which is obtained, under the same operating conditions, when the heat transfer fluid is replaced by 1,1,1,2-tetrafluoroethane in the vapor compression circuit.

According to one embodiment of the process for converting a vapor compression circuit above, the (initial or final) vapor compression circuit comprises an evaporator and a condenser, and:

the difference between the pressure at the condenser and the pressure at the evaporator in the final vapor compression circuit is less than or equal to the difference between the pressure at the condenser and the pressure at the evaporator in the initial vapor compression circuit, under the same operating conditions.

According to a first variant of the cooling or heating process or of the cooling or heating installation above, the centrifugal compressor is provided with rotational speed adaptation means, and:

the rotational speed of the centrifugal compressor is less than or equal to the rotational speed that the centrifugal compressor has, under the same operating conditions, when the heat transfer fluid is replaced by 1,1,1,2-tetrafluoroethane in the vapor compression circuit.

According to a first variant of the process for converting a vapor compression circuit above, the centrifugal compressor is provided with rotational speed adaptation means, and:

the rotational speed of the centrifugal compressor in the final vapor compression circuit is adjusted to a value less than or equal to the rotational speed of the centrifugal compressor in the initial vapor compression circuit, under the same operating conditions.

According to the first variant of the above processes and installation (variable speed variant), the heat transfer fluid preferably comprises:

from 2% to 50% of 2,3,3,3-tetrafluoropropene and from 50% to 98% of 1,1,1,2-tetrafluoroethane, preferably from 5% to 40% of 2,3,3,3-tetrafluoropropene and from 60% to 95% of 1,1,1,2-tetrafluoroethane, and more particularly preferably from 5% to 30% of 2,3,3,3-tetrafluoropropene and from 70% to 95% of 1,1,1,2-tetrafluoroethane; or from 50% to 95% of 2,3,3,3-tetrafluoropropene and from 5% to 50% of 1,1-difluoroethane, preferably from 60% to 95% of 2,3,3,3-tetrafluoropropene and from 5% to 40% of 1,1-difluoroethane, and more particularly preferably from 85% to 90% of 2,3,3,3-tetrafluoropropene and from 10% to 15% of 1,1-difluoroethane; or from 10% to 70% of 2,3,3,3-tetrafluoropropene and from 30% to 90% of 3,3,3-trifluoropropene, preferably from 20% to 60% of 2,3,3,3-tetrafluoropropene and from 40% to 80% of 3,3,3-trifluoropropene, and more particularly preferably from 40% to 50% of 2,3,3,3-tetrafluoropropene and from 50% to 60% of 3,3,3-trifluoropropene; or from 20% to 70% of 1,3,3,3-tetrafluoropropene and from 30% to 80% of 3,3,3-trifluoropropene, preferably from 30% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 55% to 65% of 3,3,3-trifluoropropene; or from 10% to 90% of 2,3,3,3-tetrafluoropropene, from 5% to 70% of 1,3,3,3-tetrafluoropropene and from 5% to 30% of 1,1-difluoroethane, preferably from 20% to 85% of 2,3,3,3-tetrafluoropropene, from 5% to 60% of 1,3,3,3-tetrafluoropropene and from 10% to 20% of 1,1-difluoroethane, and more particularly preferably from 30% to 85% of 2,3,3,3-tetrafluoropropene, from 5% to 50% of 1,3,3,3-tetrafluoropropene and from 10% to 15% of 1,1-difluoroethane; or from 10% to 93% of 2,3,3,3-tetrafluoropropene, from 5% to 80% of 1,1,1,2-tetrafluoroethane and from 2% to 50% of 1,1-difluoroethane, preferably from 13% to 93% of 2,3,3,3-tetrafluoropropene, from 5% to 60% of 1,1,1,2-tetrafluoroethane and from 2% to 30% of 1,1-difluoroethane, and more particularly preferably from 25% to 92% of 2,3,3,3-tetrafluoropropene, from 5% to 60% of 1,1,1,2-tetrafluoroethane and from 3% to 15% of 1,1-difluoroethane; or from 5% to 90% of 2,3,3,3-tetrafluoropropene, from 5% to 60% of 1,1,1,2-tetrafluoroethane and from 5% to 70% of 3,3,3-trifluoropropene, preferably from 10% to 85% of 2,3,3,3-tetrafluoropropene, from 5% to 60% of 1,1,1,2-tetrafluoroethane and from 10% to 70% of 3,3,3-trifluoropropene, and more particularly preferably from 10% to 60% of 2,3,3,3-tetrafluoropropene, from 5% to 50% of 1,1,1,2-tetrafluoroethane and from 20% to 60% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene, preferably from 35% to 89% of 2,3,3,3-tetrafluoropropene, from 3% to 15% of 1,1-difluoroethane and from 8% to 50% of 3,3,3-trifluoropropene, and more particularly preferably from 50% to 85% of 2,3,3,3-tetrafluoropropene, from 5% to 10% of 1,1-difluoroethane and from 10% to 40% of 3,3,3-trifluoropropene; or from 10% to 60% of 1,3,3,3-tetrafluoropropene, from 20% to 87% of 1,1,1,2-tetrafluoroethane and from 3% to 20% of 1,1-difluoroethane, preferably from 10% to 40% of 1,3,3,3-tetrafluoropropene, from 45% to 87% of 1,1,1,2-tetrafluoroethane and from 3% to 15% of 1,1-difluoroethane, and more particularly preferably from 10% to 30% of 1,3,3,3-tetrafluoropropene, from 60% to 85% of 1,1,1,2-tetrafluoroethane and from 5% to 10% of 1,1-difluoroethane; or from 25% to 82% of 1,3,3,3-tetrafluoropropene, from 3% to 15% of 1,1-difluoroethane and from 15% to 60% of 3,3,3-trifluoropropene, preferably from 35% to 82% of 1,3,3,3-tetrafluoropropene, from 3% to 15% of 1,1-difluoroethane and from 15% to 50% of 3,3,3-trifluoropropene, and more particularly preferably from 40% to 75% of 1,3,3,3-tetrafluoropropene, from 5% to 10% of 1,1-difluoroethane and from 20% to 50% of 3,3,3-trifluoropropene.

According to a second variant of the above cooling or heating process, cooling or heating installation and process for converting a vapor compression circuit, the centrifugal compressor is devoid of rotational speed adaptation means.

According to this second variant of the above processes and installation (constant speed variant), the heat transfer fluid preferably comprises:

from 2% to 50% of 2,3,3,3-tetrafluoropropene and from 50% to 98% of 1,1,1,2-tetrafluoroethane, preferably from 2% to 30% of 2,3,3,3-tetrafluoropropene and from 70% to 98% of 1,1,1,2-tetrafluoroethane, and more particularly preferably from 5% to 15% of 2,3,3,3-tetrafluoropropene and from 85% to 95% of 1,1,1,2-tetrafluoroethane; or from 50% to 90% of 2,3,3,3-tetrafluoropropene and from 10% to 50% of 1,1-difluoroethane, preferably from 60% to 90% of 2,3,3,3-tetrafluoropropene and from 10% to 40% of 1,1-difluoroethane, and more particularly preferably from 70% to 80% of 2,3,3,3-tetrafluoropropene and from 20% to 30% of 1,1-difluoroethane; or from 10% to 40% of 2,3,3,3-tetrafluoropropene and from 60% to 90% of 3,3,3-trifluoropropene, preferably from 10% to 30% of 2,3,3,3-tetrafluoropropene and from 70% to 90% of 3,3,3-trifluoropropene, and more particularly preferably from 10% to 20% of 2,3,3,3-tetrafluoropropene and from 80% to 90% of 3,3,3-trifluoropropene; or from 20% to 70% of 1,3,3,3-tetrafluoropropene and from 30% to 80% of 3,3,3-trifluoropropene, preferably from 20% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 50% to 65% of 3,3,3-trifluoropropene; or from 15% to 85% of 2,3,3,3-tetrafluoropropene, from 5% to 60% of 1,3,3,3-tetrafluoropropene and from 5% to 30% of 1,1-difluoroethane, preferably from 20% to 85% of 2,3,3,3-tetrafluoropropene, from 5% to 50% of 1,3,3,3-tetrafluoropropene and from 10% to 30% of 1,1-difluoroethane, and more particularly preferably from 35% to 80% of 2,3,3,3-tetrafluoropropene, from 5% to 40% of 1,3,3,3-tetrafluoropropene and from 15% to 25% of 1,1-difluoroethane; or from 18% to 93% of 2,3,3,3-tetrafluoropropene, from 5% to 80% of 1,1,1,2-tetrafluoroethane and from 2% to 50% of 1,1-difluoroethane, preferably from 20% to 93% of 2,3,3,3-tetrafluoropropene, from 5% to 60% of 1,1,1,2-tetrafluoroethane and from 2% to 30% of 1,1-difluoroethane, and more particularly preferably from 30% to 88% of 2,3,3,3-tetrafluoropropene, from 5% to 60% of 1,1,1,2-tetrafluoroethane and from 7% to 20% of 1,1-difluoroethane; or from 10% to 80% of 2,3,3,3-tetrafluoropropene, from 5% to 60% of 1,1,1,2-tetrafluoroethane and from 15% to 80% of 3,3,3-trifluoropropene, preferably from 10% to 75% of 2,3,3,3-tetrafluoropropene, from 5% to 60% of 1,1,1,2-tetrafluoroethane and from 20% to 80% of 3,3,3-trifluoropropene, and more particularly preferably from 10% to 65% of 2,3,3,3-tetrafluoropropene, from 5% to 50% of 1,1,1,2-tetrafluoroethane and from 30% to 80% of 3,3,3-trifluoropropene; or from 10% to 78% of 2,3,3,3-tetrafluoropropene, from 3% to 15% of 1,1-difluoroethane and from 20% to 70% of 3,3,3-trifluoropropene, preferably from 15% to 67% of 2,3,3,3-tetrafluoropropene, from 3% to 10% of 1,1-difluoroethane and from 30% to 70% of 3,3,3-trifluoropropene, and more particularly preferably from 21% to 57% of 2,3,3,3-tetrafluoropropene, from 3% to 9% of 1,1-difluoroethane and from 40% to 70% of 3,3,3-trifluoropropene; or from 15% to 60% of 1,3,3,3-tetrafluoropropene, from 20% to 82% of 1,1,1,2-tetrafluoroethane and from 3% to 20% of 1,1-difluoroethane, preferably from 15% to 50% of 1,3,3,3-tetrafluoropropene, from 35% to 82% of 1,1,1,2-tetrafluoroethane and from 3% to 15% of 1,1-difluoroethane, and more particularly preferably from 20% to 30% of 1,3,3,3-tetrafluoropropene, from 60% to 75% of 1,1,1,2-tetrafluoroethane and from 5% to 10% of 1,1-difluoroethane; or from 35% to 77% of 1,3,3,3-tetrafluoropropene, from 3% to 15% of 1,1-difluoroethane and from 20% to 50% of 3,3,3-trifluoropropene, preferably from 35% to 72% of 1,3,3,3-tetrafluoropropene, from 3% to 15% of 1,1-difluoroethane and from 25% to 50% of 3,3,3-trifluoropropene, and more particularly preferably from 40% to 66% of 1,3,3,3-tetrafluoropropene, from 4% to 10% of 1,1-difluoroethane and from 30% to 50% of 3,3,3-trifluoropropene.

One subject of the invention is more particularly:

a process for cooling or heating a fluid or a body by means of a vapor compression circuit comprising a centrifugal compressor and containing a heat transfer fluid;

an installation for cooling or heating a fluid or a body comprising a vapor compression circuit comprising a centrifugal compressor and containing a heat transfer fluid; and a process for converting a vapor compression circuit comprising the provision of an initial vapor compression circuit comprising a centrifugal compressor and containing 1,1,1,2-tetrafluoroethane as heat transfer fluid, and the replacement of the 1,1,1,2-tetrafluoroethane with a substitute heat transfer fluid in order to provide a final vapor compression circuit;

in which the heat transfer fluid (that is to say the substitute heat transfer fluid in the case of the conversion process) comprises, and preferably consists of:

from 2% to 50% of 2,3,3,3-tetrafluoropropene, and from 50% to 98% of 1,1,1,2-tetrafluoroethane; or from 50% to 95% of 2,3,3,3-tetrafluoropropene and from 5% to 50% of 1,1-difluoroethane; or from 10% to 70% of 2,3,3,3-tetrafluoropropene and from 30% to 90% of 3,3,3-trifluoropropene; or from 20% to 70% of 1,3,3,3-tetrafluoropropene and from 30% to 80% of 3,3,3-trifluoropropene; or from 10% to 70% of 1,1,1,2-tetrafluoroethane and from 30% to 90% of 3,3,3-trifluoropropene; or from 10% to 90% of 2,3,3,3-tetrafluoropropene, from 5% to 70% of 1,3,3,3-tetrafluoropropene and from 5% to 30% of 1,1-difluoroethane; or from 10% to 93% of 2,3,3,3-tetrafluoropropene, from 5% to 80% of 1,1,1,2-tetrafluoroethane and from 2% to 50% of 1,1-difluoroethane; or from 5% to 90% of 2,3,3,3-tetrafluoropropene, from 5% to 60% of 1,1,1,2-tetrafluoroethane and from 5% to 80% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene; or from 10% to 60% of 1,3,3,3-tetrafluoropropene, from 20% to 87% of 1,1,1,2-tetrafluoroethane and from 3% to 20% of 1,1-difluoroethane; or from 25% to 82% of 1,3,3,3-tetrafluoropropene, from 3% to 15% of 1,1-difluoroethane and from 15% to 60% of 3,3,3-trifluoropropene.

According to one embodiment of this more particular invention, the heat transfer fluid comprises:

from 2% to 30% of 2,3,3,3-tetrafluoropropene, and from 70% to 98% of 1,1,1,2-tetrafluoroethane, preferably from 5% to 15% of 2,3,3,3-tetrafluoropropene and from 85% to 95% of 1,1,1,2-tetrafluoroethane; or from 5% to 40% of 2,3,3,3-tetrafluoropropene and from 60% to 95% of 1,1,1,2-tetrafluoroethane preferably from 5% to 30% of 2,3,3,3-tetrafluoropropene and from 70% to 95% of 1,1,1,2-tetrafluoroethane; or from 60% to 90% of 2,3,3,3-tetrafluoropropene and from 10% to 40% of 1,1-difluoroethane, preferably from 70% to 80% of 2,3,3,3-tetrafluoropropene and from 20% to 30% of 1,1-difluoroethane; or from 60% to 95% of 2,3,3,3-tetrafluoropropene and from 5% to 40% of 1,1-difluoroethane, preferably from 85% to 90% of 2,3,3,3-tetrafluoropropene and from 10% to 15% of 1,1-difluoroethane; or from 10% to 30% of 2,3,3,3-tetrafluoropropene and from 70% to 90% of 3,3,3-trifluoropropene, preferably from 10% to 20% of 2,3,3,3-tetrafluoropropene and from 80% to 90% of 3,3,3-trifluoropropene; or from 20% to 60% of 2,3,3,3-tetrafluoropropene and from 40% to 80% of 3,3,3-trifluoropropene, preferably from 40% to 50% of 2,3,3,3-tetrafluoropropene and from 50% to 60% of 3,3,3-trifluoropropene; or from 30% to 60% of 1,3,3,3-tetrafluoropropene and from 40% to 70% of 3,3,3-trifluoropropene, preferably from 30% to 50% of 1,3,3,3-tetrafluoropropene and from 50% to 70% of 3,3,3-trifluoropropene; or from 20% to 60% of 1,1,1,2-tetrafluoroethane and from 40% to 80% of 3,3,3-trifluoropropene, preferably from 35% to 50% of 1,1,1,2-tetrafluoroethane and from 50% to 65% of 3,3,3-trifluoropropene; or from 20% to 85% of 2,3,3,3-tetrafluoropropene, from 5% to 50% of 1,3,3,3-tetrafluoropropene and from 10% to 30% of 1,1-difluoroethane, preferably from 35% to 80% of 2,3,3,3-tetrafluoropropene, from 5% to 40% of 1,3,3,3-tetrafluoropropene and from 15% to 25% of 1,1-difluoroethane; or from 20% to 85% of 2,3,3,3-tetrafluoropropene, from 5% to 60% of 1,3,3,3-tetrafluoropropene and from 10% to 20% of 1,1-difluoroethane, preferably from 30% to 85% of 2,3,3,3-tetrafluoropropene, from 5% to 50% of 1,3,3,3-tetrafluoropropene and from 10% to 15% of 1,1-difluoroethane; or from 20% to 93% of 2,3,3,3-tetrafluoropropene, from 5% to 60% of 1,1,1,2-tetrafluoroethane and from 2% to 30% of 1,1-difluoroethane, preferably from 30% to 88% of 2,3,3,3-tetrafluoropropene, from 5% to 60% of 1,1,1,2-tetrafluoroethane and from 7% to 20% of 1,1-difluoroethane; or from 13% to 93% of 2,3,3,3-tetrafluoropropene, from 5% to 60% of 1,1,1,2-tetrafluoroethane and from 2% to 30% of 1,1-difluoroethane, preferably from 25% to 92% of 2,3,3,3-tetrafluoropropene, from 5% to 60% of 1,1,1,2-tetrafluoroethane and from 3% to 15% of 1,1-difluoroethane; or from 10% to 75% of 2,3,3,3-tetrafluoropropene, from 5% to 60% of 1,1,1,2-tetrafluoroethane and from 20% to 80% of 3,3,3-trifluoropropene, preferably from 10% to 65% of 2,3,3,3-tetrafluoropropene, from 5% to 50% of 1,1,1,2-tetrafluoroethane and from 30% to 80% of 3,3,3-trifluoropropene; or from 10% to 85% of 2,3,3,3-tetrafluoropropene, from 5% to 60% of 1,1,1,2-tetrafluoroethane and from 10% to 70% of 3,3,3-trifluoropropene, preferably from 10% to 60% of 2,3,3,3-tetrafluoropropene, from 5% to 50% of 1,1,1,2-tetrafluoroethane and from 20% to 60% of 3,3,3-trifluoropropene; or from 15% to 67% of 2,3,3,3-tetrafluoropropene, from 3% to 10% of 1,1-difluoroethane and from 30% to 70% of 3,3,3-trifluoropropene, preferably from 21% to 57% of 2,3,3,3-tetrafluoropropene, from 3% to 9% of 1,1-difluoroethane and from 40% to 70% of 3,3,3-trifluoropropene; or from 35% to 89% of 2,3,3,3-tetrafluoropropene, from 3% to 15% of 1,1-difluoroethane and from 8% to 50% of 3,3,3-trifluoropropene, preferably from 50% to 85% of 2,3,3,3-tetrafluoropropene, from 5% to 10% of 1,1-difluoroethane and from 10% to 40% of 3,3,3-trifluoropropene; or from 15% to 50% of 1,3,3,3-tetrafluoropropene, from 35% to 82% of 1,1,1,2-tetrafluoroethane and from 3% to 15% of 1,1-difluoroethane, preferably from 20% to 30% of 1,3,3,3-tetrafluoropropene, from 60% to 75% of 1,1,1,2-tetrafluoroethane and from 5% to 10% of 1,1-difluoroethane; or from 10% to 40% of 1,3,3,3-tetrafluoropropene, from 45% to 87% of 1,1,1,2-tetrafluoroethane and from 3% to 15% of 1,1-difluoroethane, preferably from 10% to 30% of 1,3,3,3-tetrafluoropropene, from 60% to 85% of 1,1,1,2-tetrafluoroethane and from 5% to 10% of 1,1-difluoroethane; or from 35% to 72% of 1,3,3,3-tetrafluoropropene, from 3% to 15% of 1,1-difluoroethane and from 25% to 50% of 3,3,3-trifluoropropene, preferably from 40% to 66% of 1,3,3,3-tetrafluoropropene, from 4% to 10% of 1,1-difluoroethane and from 30% to 50% of 3,3,3-trifluoropropene; or from 35% to 82% of 1,3,3,3-tetrafluoropropene, from 3% to 15% of 1,1-difluoroethane and from 15% to 50% of 3,3,3-trifluoropropene, preferably from 40% to 75% of 1,3,3,3-tetrafluoropropene, of 5% to 10% of 1,1-difluoroethane and from 20% to 50% of 3,3,3-trifluoropropene.

According to one embodiment of any one of the above installations, the installation is a mobile or stationary air-conditioning installation, preferably a stationary air-conditioning installation.

Furthermore, one subject of the invention is a composition suitable for the implementation of any one of the above processes and suitable for the manufacture of any one of the above installations, comprising:

from 10% to 90% of 2,3,3,3-tetrafluoropropene, from 5% to 70% of 1,3,3,3-tetrafluoropropene and from 5% to 30% of 1,1-difluoroethane; or from 5% to 90% of 2,3,3,3-tetrafluoropropene, from 5% to 60% of 1,1,1,2-tetrafluoroethane and from 5% to 80% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene.

According to one embodiment, the composition comprises:

from 20% to 85% of 2,3,3,3-tetrafluoropropene, from 5% to 50% of 1,3,3,3-tetrafluoropropene and from 10% to 30% of 1,1-difluoroethane, preferably from 35% to 80% of 2,3,3,3-tetrafluoropropene, from 5% to 40% of 1,3,3,3-tetrafluoropropene and from 15% to 25% of 1,1-difluoroethane; or from 20% to 85% of 2,3,3,3-tetrafluoropropene, from 5% to 60% of 1,3,3,3-tetrafluoropropene and from 10% to 20% of 1,1-difluoroethane, preferably from 30% to 85% of 2,3,3,3-tetrafluoropropene, from 5% to 50% of 1,3,3,3-tetrafluoropropene, and from 10% to 15% of 1,1-difluoroethane; or from 10% to 75% of 2,3,3,3-tetrafluoropropene, from 5% to 60% of 1,1,1,2-tetrafluoroethane and from 20% to 80% of 3,3,3-trifluoropropene, preferably from 10% to 65% of 2,3,3,3-tetrafluoropropene, from 5% to 50% of 1,1,1,2-tetrafluoroethane and from 30% to 80% of 3,3,3-trifluoropropene; or from 10% to 85% of 2,3,3,3-tetrafluoropropene, from 5% to 60% of 1,1,1,2-tetrafluoroethane and from 10% to 70% of 3,3,3-trifluoropropene, preferably from 10% to 60% of 2,3,3,3-tetrafluoropropene, from 5% to 50% of 1,1,1,2-tetrafluoroethane and from 20% to 60% of 3,3,3-trifluoropropene; or from 15% to 67% of 2,3,3,3-tetrafluoropropene, from 3% to 10% of 1,1-difluoroethane and from 30% to 70% of 3,3,3-trifluoropropene, preferably from 21% to 57% of 2,3,3,3-tetrafluoropropene, from 3% to 9% of 1,1-difluoroethane and from 40% to 70% of 3,3,3-trifluoropropene; or from 35% to 89% of 2,3,3,3-tetrafluoropropene, from 3% to 15% of 1,1-difluoroethane and from 8% to 50% of 3,3,3-trifluoropropene, preferably from 50% to 85% of 2,3,3,3-tetrafluoropropene, from 5% to 10% of 1,1-difluoroethane and from 10% to 40% of 3,3,3-trifluoropropene.

Another subject of the invention is a heat transfer composition, comprising the above composition, and also one or more additives chosen from lubricants, stabilizers, surfactants, tracers, fluorescent agents, odorous agents, solubilization agents and mixtures thereof.

The present invention makes it possible to overcome the drawbacks of the prior art. It provides, more particularly, heat transfer fluids suitable for replacing HFC-134a in a vapor compression system comprising a centrifugal compressor. The heat transfer fluids of the invention have a GWP below that of HFC-134a while guaranteeing a maintenance or even an improvement of the performances of the centrifugal compressor compared to HFC-134a. In particular, the invention makes any change of the compressor or of parts of the compressor unnecessary.

This is accomplished owing to the provision of mixtures of at least two compounds chosen from the following five compounds:

2,3,3,3-tetrafluoropropene (HFO-1234yf),
1,3,3,3-tetrafluoropropene (HFO-1234ze),
1,1,1,2-tetrafluoroethane (HFC-134a),
1,1-difluoroethane (HFC-152a) and
3,3,3-trifluoropropene (HFO-1243zf), the proportions of these compounds being chosen such that:
1) the Mach number of the centrifugal compressor is virtually identical to that of the centrifugal compressor operating with pure HFC-134a, and
2) the compression ratio of the centrifugal compressor is less than or equal to that of the centrifugal compressor operating with pure HFC-134a.

This adjustment of the proportions of the various compounds as a function of the Mach number and of the compression ratio ensures that the performances of the vapor compression cycle are maintained relative to the operation with pure HFC-134a.

According to certain particular embodiments, the invention also has one or preferably more of the advantageous features listed below.

The proportions of the compounds of the mixture forming the heat transfer fluid may also be adjusted so as to impose the additional feature that the difference between the pressure at the condenser and the pressure at the evaporator is lower (or equal) when the heat transfer fluid is the mixture in question, compared to the case where the heat transfer fluid is formed of pure HFC-134a. This makes it possible to further improve the operation of the centrifugal compressor.

Certain compositions proposed by the invention make it possible to operate the centrifugal compressor at the same speed as when pure HFC-134a is used as heat transfer fluid, the other operating parameters being identical. These compositions are particularly useful when the centrifugal compressor does not comprise speed adaptation means, since they avoid having to change the centrifugal compressor or parts thereof.

Certain compositions proposed by the invention make it possible to operate the centrifugal compressor at a speed lower than that obtained when pure HFC-134a is used as heat transfer fluid, the other operating parameters being identical. These compositions are particularly useful when the centrifugal compressor comprises speed adaptation means, since they make it possible to reduce the wear to which the centrifugal compressor is subjected by decreasing the rotational speed.

DETAILED DESCRIPTION

The invention is now described in greater detail and non-limitingly in the description which follows.

Definitions and General Points

The proportions of all of the compounds are indicated in the application as weight percentages unless otherwise mentioned.

The invention firstly provides an installation comprising a vapor compression circuit containing a heat transfer fluid, and also a process for heating or cooling a fluid or a body which may be implemented by means of said installation.

The fluid or body heated or cooled may especially be air contained in an essentially closed space.

The vapor compression circuit containing a heat transfer fluid comprises at least an evaporator, a centrifugal compressor, a condenser and an expansion valve, and also lines for transporting heat transfer fluid between these components.

A centrifugal compressor is characterized in that it uses rotating components to radially accelerate the heat transfer fluid; it typically comprises at least a rotor and a diffuser housed in a chamber. The heat transfer fluid is introduced at the center of the rotor and flows toward the periphery of the rotor while undergoing an acceleration. Thus, on the one hand, the static pressure increases in the rotor, and above all, on the other hand, at the diffuser, the speed is converted to an increase in the static pressure. Each rotor/diffuser assembly constitutes one stage of the compressor. Centrifugal compressors may comprise from 1 to 12 stages, depending on the final pressure desired and the volume of fluid to be treated.

The compression ratio is defined as being the ratio of the absolute pressure of the heat transfer fluid at the outlet to the absolute pressure of said fluid at the inlet.

The rotational speed for large centrifugal compressors ranges from 3000 to 7000 rpm. Small centrifugal compressors (or mini centrifugal compressors) generally operate at a rotational speed which ranges from 40,000 to 70,000 rpm and comprise a rotor of small size (generally less than 0.15 m).

It is possible to use a multi-stage rotor to improve the efficiency of the compressor and limit the energy cost (compared to a single-stage rotor). For a two-stage system, the outlet of the first stage of the rotor feeds the inlet of the second rotor. The two rotors may be mounted on a single axis. Each stage may provide a compression ratio of the fluid of around 4 to 1, that is to say that the absolute outlet pressure may be equal to around four times the absolute suction pressure. Examples of two-stage centrifugal compressors, in particular for motor vehicle applications, are described in documents U.S. Pat. Nos. 5,065,990 and 5,363,674.

The centrifugal compressor may be driven by an electric motor or by a gas turbine (for example fed by the exhaust gases of a vehicle, for mobile applications) or by gearing.

The installation may comprise a coupling of the expansion valve with a turbine in order to produce electricity (Rankine cycle).

The installation may also optionally comprise at least one coolant circuit used for transmitting heat (with or without a change of state) between the heat transfer fluid circuit and the fluid or body to be heated or cooled.

The installation may also comprise two (or more) vapor compression circuits containing identical or different heat transfer fluids. For example, the vapor compression circuits may be coupled together.

The vapor compression circuit operates according to a conventional vapor compression cycle. The cycle comprises the change of state of the heat transfer fluid from a liquid phase (or liquid/vapor two phase state) to a vapor phase at a relatively low pressure, then the compression of the fluid in the vapor phase to a relatively high pressure, the change of state (condensation) of the heat transfer fluid from the vapor phase to the liquid phase at a relatively high pressure, and the reduction of the pressure in order to recommence the cycle.

In the case of a cooling process, heat from the fluid or from the body that is being cooled (directly or indirectly, via a coolant) is absorbed by the heat transfer fluid, during the evaporation of the latter, this being at a relatively low temperature compared to the surroundings.

In the case of a heating process, heat is imparted (directly or indirectly, via a coolant) from the heat transfer fluid, during the condensation thereof, to the fluid or body that is being heated, this being at a relatively high temperature compared to the surroundings.

The cooling or heating installation according to the invention may be a mobile or stationary installation.

It may especially be a heat pump installation, in which case the fluid or body that is being heated (generally air and optionally one or more products, articles or organisms) is located in a room or in a vehicle passenger compartment (for a mobile installation). According to one preferred embodiment, it is an air conditioning installation, in which case the fluid or body that is being cooled (generally air and optionally one or more products, articles or organisms) is located in a room or in a vehicle passenger compartment (for a mobile installation). It may be a refrigerating installation or a freezing installation (or cryogenic installation), in which case the fluid or body that is being cooled generally comprises air and one or more products, articles or organisms, located in a room or in a container.

The expressions "heat transfer compound", respectively "heat transfer fluid" (or refrigerant fluid), are understood to mean a compound, respectively a fluid, capable of absorbing heat by evaporating at an evaporating temperature and evaporating pressure and of releasing heat by condensing at a condensing temperature and condensing pressure, which are greater, respectively, than the evaporating temperature and evaporating pressure, in a vapor compression circuit. A heat transfer fluid may comprise one, two, three or more than three heat transfer compounds.

One or more additives (which are predominantly not heat transfer compounds for the envisaged application) are generally added to the heat transfer fluid in order to provide a "heat transfer composition" that circulates in the vapor compression circuit.

The additives may especially be chosen from lubricants, stabilizers, surfactants, tracers, fluorescent agents, odorous agents and solubilization agents.

The stabilizer or stabilizers, when they are present, preferably represent at most 5% by weight in the heat transfer composition. Among the stabilizers, mention may especially be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl, optionally fluorinated or perfluorinated, or alkenyl or aromatic epoxides) such as n-butyl glycidyl ether, hexanediol diglycidyl ether, allyl glycidyl ether, butylphenyl glycidyl ether, phosphites, phosphonates, thiols and lactones.

As lubricants, use may especially be made of oils of mineral origin, silicone oils, paraffins of natural origin, naphthenes, synthetic paraffins, alkylbenzenes, poly-α-olefins, polyalkylene glycols, polyol esters and/or polyvinyl ethers.

As tracers (capable of being detected), mention may be made of deuterated or undeuterated hydrofluorocarbons, deuterated hydrocarbons, perfluorocarbons, fluoroethers, brominated compounds, iodinated compounds, alcohols, aldehydes, ketones, nitrogen protoxide and combinations thereof. The tracer is different from the heat transfer compound(s) making up the heat transfer fluid.

As solubilization agents, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilization agent is different from the heat transfer compound(s) making up the heat transfer fluid.

As fluorescent agents, mention may be made of naphthalimides, perylenes, coumarins, anthracenes, phenanthracenes, xanthenes, thioxanthenes, naphthaxanthenes, fluoresceins and derivatives and combinations thereof.

As odorous agents, mention may be made of alkyl acrylates, allyl acrylates, acrylic acids, acrylic esters, alkyl ethers, alkyl esters, alkynes, aldehydes, thiols, thioethers, disulfides, allyl isothiocyanates, alkanoic acids, amines, norbornenes, derivatives of norbornenes, cyclohexene, heterocyclic aromatic compounds, ascaridole, o-methoxy (methyl)phenol and combinations thereof.

According to the present application, the global warming potential (GWP) is defined relative to carbon dioxide and relative to a period of 100 years, according to the method indicated in "The scientific assessment of ozone depletion, 2002, a report of the World Meteorological Association's Global Ozone Research and Monitoring Project".

IMPLEMENTATION OF EMBODIMENTS

The invention is based on the choice of two criteria that make it possible to produce heat transfer fluids suitable for vapor compression circuits comprising a centrifugal compressor, and more specifically that make it possible to maintain (or improve) the performances of the centrifugal compressor without having to modify the structure thereof, relative to an operation based on the use of pure HFC-134a as heat transfer fluid.

The first criterion set by the invention is that of the Mach number. The Mach number is equal to the ratio of the peripheral speed of the rotor of the compressor to the speed of sound at the inlet of said rotor.

The second criterion set by the invention is that of the compression ratio of this compressor. The compression ratio is the ratio of the absolute pressure at the outlet to the absolute pressure at the inlet of the centrifugal compressor.

In order to guarantee that the performances of the centrifugal compressor are maintained (or even improved) relative to the heat transfer fluid HFC-134a, it is desired for the Mach number $M_2$ of the centrifugal compressor operating with the heat transfer fluid in question to be practically equal to the reference Mach number $M_1$ of the centrifugal compressor operating with pure HFC-134a as heat transfer fluid; more specifically, it is desired for the $M_2/M_1$ ratio to be greater than or equal to 0.97 and less than or equal to 1.03 (preferably greater than or equal to 0.98 and less than or equal to 1.02, or greater than or equal to 0.99 and less than or equal to 1.01, or equal to approximately 1); and it is also desired for the compression ratio $T_2$ of the centrifugal compressor operating with the heat transfer fluid in question to be less than or equal to the reference compression ratio $T_1$ of the centrifugal compressor operating with pure HFC-134a as heat transfer fluid.

A third criterion (optionally) used according to the invention, in addition to the preceding two, is that of the difference between the pressure at the condenser and the pressure at the evaporator. Thus, according to one particular embodiment, it is desired for this pressure difference $DP_2$ of the vapor compression circuit operating with the heat transfer fluid in question to be less than or equal to the pressure difference $DP_1$ of the vapor compression circuit operating with the reference heat transfer fluid (pure HFC-134a).

The Mach number of the centrifugal compressor must be virtually identical to that of the centrifugal compressor operating with pure HFC-134a in order to guarantee an equivalent operation and to enable a possible conversion of the installation. On the other hand, at constant rotational speed, the increase of the compression ratio results in a decrease of the power of the compressor working under the same temperature conditions. Similarly, the work necessary for the compression decreases with the decrease of the pressure difference between the evaporator and the condenser. This means that the efficiency of the system increases with the decrease of the pressure difference and of the compression ratio between the evaporator and the condenser for the same operating temperatures.

For each of the preceding criteria, the comparison between the heat transfer fluid in question and pure HFC-134a is carried out under the same operating conditions, which means, on the one hand, that the vapor compression circuit is exactly the same and the structure of the centrifugal compressor is exactly the same; and, on the other hand, that the temperature at the evaporator and at the condenser are identical in both cases. For example, the comparison may be made with a temperature of 4° C. at the evaporator and of 37° C. at the condenser.

According to the second variant of the invention (constant speed variant), the centrifugal compressor operates at a predetermined speed which cannot be modified. The rotor then rotates at the same speed with the transfer fluid in question and with the reference fluid (pure HFC-134a).

On the other hand, according to the first variant of the invention (variable speed variant), the centrifugal compressor may operate in a certain range of speeds. This is especially the case for a centrifugal compressor operating with an electric motor and endowed with a variable speed drive.

In this first variant, a modification of the speed of the compressor between the operation with the reference heat transfer fluid (pure HFC-134a) and the transfer fluid in question may make it possible to obtain an $M_2/M_1$ ratio from 0.97 to 1.03 and a $T_2/T_1$ ratio less than or equal to 1 for heat transfer fluid formulations other than those that make it possible to obtain an $M_2/M_1$ ratio from 0.97 to 1.03 and a $T_2/T_1$ ratio less than or equal to 1 at identical rotor speed. In other words, this second embodiment makes it possible to broaden the range of heat transfer fluids that can be envisaged.

Still according to this first variant, it is particularly advantageous to make provision for the speed of the rotor with the heat transfer fluid in question to be less than the speed of the rotor with the reference heat transfer fluid (pure HFC-134a). Indeed, this makes it possible to limit the wear to which the centrifugal compressor is subjected.

In both variants, the $M_2/M_1$ and $T_2/T_1$ (and optionally $DP_2/DP_1$) ratios may be determined experimentally or by calculation and/or numerical simulation.

The Mach number, the compression ratio and the pressure difference are calculated for each mixture under the same typical operating conditions. These calculations are performed using the corresponding thermodynamic models for each product. The modeling method is based on the RK-Soave equation. The development of the models is based on experimental measurements described in example 1.

Heat transfer fluids comprising at least two compounds chosen from HFO-1234yf, HFO-1234ze, HFC-134a, HFC-152a and HFO-1243zf satisfy the two (or three) criteria mentioned above and therefore provide very effective substitutes for pure HFC-134a in the vapor compression circuits with a centrifugal compressor.

All of these five compounds have a similar boiling point, between −30 and −18° C. HFO-1234ze can be in its cis or trans form. Preferably, the HFO-1234ze used within the context of the invention contains at least 80% of trans form, preferably at least 90% or at least 95% or at least 98% or at least 99% of trans form.

These heat transfer fluids may be constituted by two of the above compounds or three of the above compounds or four of the above compounds or else the five compounds above.

In addition, it is desirable for the heat transfer fluids:
- to be nonflammable (within the meaning of the ASHRAE 34-2007 standard, and preferably with a test temperature of 60° C. instead of 100° C.);
- to be quasi-azeotropic; and
- to have a low GWP (in particular, the heat transfer fluids may have a GWP less than or equal to 1250, preferably less than or equal to 1000, less than or equal to 750, less than or equal to 500, less than or equal to 250, or less than or equal to 150).

Heat transfer fluids that are particularly suitable for the substitution of pure HFC-134a in a vapor compression circuit comprising a constant speed centrifugal compressor are listed below:

binary heat transfer fluids:
- HFO-1234y/HFC-134a: from 2 to 50% of HFO-1234yf and from 50 to 98% of HFC-134a, in particular from 2 to 30% of HFO-1234yf and from 70 to 98% of HFC-134a, and in particular from 5 to 15% of HFO-1234yf and from 85 to 95% of HFC-134a;
- HFO-1234yf/HFC-152a: from 50 to 90% of HFO-1234yf and from 10 to 50% of HFC-152a, in particular from 60 to 90% of HFO-1234yf and from 10 to 40% of HFC-152a and in particular from 70 to 80% of HFO-1234yf and from 20 to 30% of HFC-152a;
- HFO-1243zf/HFC-134a: from 30 to 90% of HFO-1243zf and from 10 to 70% of HFC-134a, in particular from 40 to 80% of HFO-1243zf and from 20 to 60% of HFC-134a, and in particular from 50 to 65% of HFO-1243zf and from 35 to 50% of HFC-134a;
- HFO-1243zf/HFO-1234yf: from 60 to 90% of HFO-1243zf and from 10 to 40% of HFO-1234yf, in particular from 70 to 90% of HFO-1243zf and from 10 to 30% of HFO-1234yf, and in particular from 80 to 90% of HFO-1243zf and from 10 to 20% of HFO-1234yf;
- HFO-1243zf/HFO-1234ze: from 30 to 80% of HFO-1243zf and from 20 to 70% of HFO-1234ze, in particular from 40 to 70% of HFO-1243zf and from 20 to 60% of HFO-1234ze, and in particular from 50 to 70% of HFO-1243zf and from 30 to 50% of HFO-1234ze;

ternary heat transfer fluids:
- HFO-1234yf/HFC-134a/HFC-152a: from 18 to 93% of HFO-1234yf and from 5 to 80% of HFC-134a and from 2 to 50% of HFC-152a, in particular from 20 to 93% of HFO-1234yf and from 5 to 60% of HFC-134a and from 2 to 30% of HFC-152a, and in particular from 30 to 88% of HFO-1234yf and from 5 to 60% of HFC-134a and from 7 to 20% of HFC-152a;
- HFO-1234yf/HFC-134a/HFO-1243zf: from 10 to 80% of HFO-1234yf and from 5 to 60% of HFC-134a and from 15 to 80% of HFO-1243zf, in particular from 10 to 75% of HFO-1234yf and from 5 to 60% of HFC-134a and from 20 to 80% of HFO-1243zf, and in particular from 10 to 65% of HFO-1234yf and from 5 to 50% of HFC-134a and from 30 to 80% of HFO-1243zf;
- HFO-1234yf/HFC-152a/HFO-1234ze: from 15 to 85% of HFO-1234yf and from 5 to 30% of HFC-152a and from 5 to 60% of HFO-1234ze, in particular from 20 to 85% of HFO-1234yf and from 10 to 30% of HFC-152a and from 5 to 50% of HFO-1234ze, and in particular from 35 to 80% of HFO-1234yf and from 15 to 25% of HFC-152a and from 5 to 40% of HFO-1234ze;
- HFO-1234yf/HFC-152a/HFO-1243zf: from 10 to 78% of HFO-1234yf and from 3 to 15% of HFC-152a and from 20 to 70% of HFO-1243zf, in particular from 15 to 67% of HFO-1234yf and from 3 to 10% of HFC-152a and from 30 to 70% of HFO-1243zf, and in particular from 21 to 57% of HFO-1234yf and from 3 to 9% of HFC-152a and from 40 to 70% of HFO-1243zf;

HFC-134a/HFC-152a/HFO-1234ze: from 20 to 82% of HFC-134a and from 3 to 20% of HFC-152a and from 15 to 60% of HFO-1234ze, in particular from 35 to 82% of HFC-134a and from 3 to 15% of HFC-152a and from 15 to 50% of HFO-1234ze, and in particular from 60 to 75% of HFC-134a and from 5 to 10% of HFC-152a and from 20 to 30% of HFO-1234ze;

HFC-152a/HFO-1243zf/HFO-1234ze: from 3 to 15% of HFO-152a and from 20 to 50% of HFO-1243zf and from 35 to 77% of HFO-1234ze, in particular from 3 to 15% of HFO-152a and from 25 to 50% of HFO-1243zf and from 35 to 72% of HFO-1234ze, and in particular from 4 to 10% of HFO-152a and from 30 to 50% of HFO-1243zf and from 40 to 66% of HFO-1234ze.

Heat transfer fluids that are particularly suitable for the substitution of pure HFC-134a in a vapor compression circuit comprising a variable speed centrifugal compressor, and in particular that enable operation of the centrifugal compressor at lower speed relative to operation with pure HFC-134a are listed below:

binary heat transfer fluids:
HFO-1234yf/HFC-134a: from 2 to 50% of HFO-1234yf and from 50 to 98% of HFC-134a, in particular from 5 to 40% of HFO-1234yf and from 60 to 95% of HFC-134a, and in particular from 5 to 30% of HFO-1234yf and from 70 to 95% of HFC-134a;

HFO-1234yf/HFC-152a: from 50 to 95% of HFO-1234yf and from 5 to 50% of HFC-152a, in particular from 60 to 95% of HFO-1234yf and from 5 to 40% of HFC-152a, and in particular from 85 to 90% of HFO-1234yf and from 10 to 15% of HFC-152a;

HFO-1243zf/HFC-134a: from 30 to 90% of HFO-1243zf and from 10 to 70% of HFC-134a, in particular from 40 to 80% of HFO-1243zf and from 20 to 60% of HFC-134a, and in particular from 50 to 65% of HFO-1243zf and from 35 to 50% of HFC-134a;

HFO-1243zf/HFO-1234yf: from 30 to 90% of HFO-1243zf and from 10 to 70% of HFO-1234yf, in particular from 40 to 80% of HFO-1243zf and from 20 to 60% of HFO-1234yf, and in particular from 50 to 60% of HFO-1243zf and from 40 to 50% of HFO-1234yf;

HFO-1243zf/HFO-1234ze: from 30 to 80% of HFO-1243zf and from 20 to 70% of HFO-1234ze, in particular from 40 to 70% of HFO-1243zf and from 30 to 60% of HFO-1234ze, and in particular from 50 to 70% of HFO-1243zf and from 30 to 50% of HFO-1234ze;

ternary heat transfer fluids:
HFO-1234yf/HFC-134a/HFC-152a: from 10 to 93% of HFO-1234yf and from 5 to 80% of HFC-134a and from 2 to 50% of HFC-152a, in particular from 13 to 93% of HFO-1234yf and from 5 to 60% of HFC-134a and from 2 to 30% of HFC-152a, and in particular from 25 to 92% of HFO-1234yf and from 5 to 60% of HFC-134a and from 3 to 15% of HFC-152a;

HFO-1234yf/HFC-134a/HFO-1243zf: from 5 to 90% of HFO-1234yf and from 5 to 60% of HFC-134a and from 5 to 70% of HFO-1243zf, in particular from 10 to 85% of HFO-1234yf and from 5 to 60% of HFC-134a and from 10 to 70% of HFO-1243zf, and in particular from 10 to 60% of HFO-1234yf and from 5 to 50% of HFC-134a and from 20 to 60% of HFO-1243zf;

HFO-1234yf/HFC-152a/HFO-1234ze: from 10 to 90% of HFO-1234yf and from 5 to 30% of HFC-152a and from 5 to 70% of HFO-1234ze, in particular from 20 to 85% of HFO-1234yf and from 10 to 20% of HFC-152a and from 5 to 60% of HFO-1234ze, and in particular from 30 to 85% of HFO-1234yf and from 10 to 15% of HFC-152a and from 5 to 50% of HFO-1234ze;

HFO-1234yf/HFC-152a/HFO-1243zf: from 10 to 89% of HFO-1234yf and from 3 to 20% of HFC-152a and from 8 to 70% of HFO-1243zf, in particular from 35 to 89% of HFO-1234yf and from 3 to 15% of HFC-152a and from 8 to 50% of HFO-1243zf, and in particular from 50 to 85% of HFO-1234yf and from 5 to 10% of HFC-152a and from 10 to 40% of HFO-1243zf;

HFC-134a/HFC-152a/HFO-1234ze: from 20 to 87% of HFC-134a and from 3 to 20% of HFC-152a and from 10 to 60% of HFO-1234ze, in particular from 45 to 87% of HFC-134a and from 3 to 15% of HFC-152a and from 10 to 40% of HFO-1234ze, and in particular from 60 to 85% of HFC-134a and from 5 to 10% of HFC-152a and from 10 to 30% of HFO-1234ze;

HFC-152a/HFO-1243zf/HFO-1234ze: from 3 to 15% of HFO-152a and from 15 to 60% of HFO-1243zf and from 25 to 82% of HFO-1234ze, in particular from 3 to 15% of HFO-152a and from 15 to 50% of HFO-1243zf and from 35 to 82% of HFO-1234ze, and in particular from 5 to 10% of HFO-152a and from 20 to 50% of HFO-1243zf and from 40 to 75% of HFO-1234ze.

EXAMPLES

The following examples illustrate the invention without limiting it.

Example 1: Centrifugal Compressor Operating at Constant Speed

In this example, a vapor compression circuit equipped with an evaporator, a condenser, a single-stage centrifugal compressor and an expansion valve is considered. The system operates with 0° C. of superheating, 0° C. of subcooling, an evaporating temperature of the heat transfer fluid at the evaporator of 4° C. and a condensing temperature of the heat transfer fluid at the condenser of 37° C.

The performances of the system with various heat transfer fluids are calculated. In order to do this, the RK-Soave equation is used for determining the specific densities, enthalpies, entropies, speed of sound, temperature, pressure and heat.

The data relating to each pure body necessary for the calculation are firstly the boiling point, the critical temperature and pressure, the pressure curve as a function of temperature from the boiling point to the critical point, the saturated liquid and saturated vapor densities as a function of the temperature, the specific heat of the ideal gases, this being for each pure body.

For HFC-134a and HFC-152a, the data is published in the ASHRAE Handbook 2005, chapter 20 and are also available in the Refprop software from NIST.

For HFO-1234ze, HFO-1234yf and HFO-1243zf, the temperature/pressure curve is measured by the static method. The critical temperature and the critical pressure are measured by a C80 calorimeter sold by Setaram. The saturation densities as a function of the temperature are measured by the technology of the vibrating-tube densimeter (laboratories of the Ecole des Mines de Paris).

Also used as data in the calculations are the binary mixture interaction coefficients, in order to represent the behavior of the products as mixtures. The coefficients are calculated as a function of the experimental liquid/vapor equilibrium data.

The technique used for the liquid/vapor equilibrium measurements is the static cell analytical method. The equilibrium cell comprises a sapphire tube and is equipped with two electromagnetic ROLSI™ samplers. It is immersed in a cryothermostat bath (HUBER HS40). A magnetic stirrer with field drive rotating at variable speed is used to accelerate the attaining of the equilibria. The analysis of the samples is carried out by gas chromatography (HP5890 series II) using a katharometer (TCD).

The liquid/vapor equilibrium measurements on the HFC-134a/HFO-1234yf binary mixture are carried out for the isotherm of 20° C. The liquid/vapor equilibrium measurements on the HFO-1234yf/HFC-152a binary mixture are carried out for the isotherm of 10° C. The liquid/vapor equilibrium measurements on the HFO-1234ze/HFC-152a binary mixture are carried out for the isotherm of 15° C. The liquid/vapor equilibrium measurements on the HFC-134a/HFO-1234ze binary mixture are carried out for the isotherm of 20° C. The liquid/vapor equilibrium measurements on the HFO-1234ze/HFO-1234yf binary mixture are carried out for the isotherm of 18° C. The liquid/vapor equilibrium measurements on the HFO-1243zf/HFO-1234yf binary mixture are carried out for the isotherm of 21° C. The liquid/vapor equilibrium measurements on the HFO-1243zf/HFC-152a binary mixture are carried out for the isotherm of 10° C. The liquid/vapor equilibrium measurements on the HFO-1243zf/HFC-134a binary mixture are carried out for the isotherm of 10° C.

The liquid/vapor equilibrium data for the HFC-134a/HFC-152a binary mixture are available from Refprop. Four isotherms (−10, 30, 40 and 50° C.) and two isobars (1 bar and 30 bar) are used for the calculation of the interaction coefficients for this binary mixture.

In the present example, it is considered that the centrifugal compressor operates at constant speed. Tables 1a, 1b and 1c summarize the performances obtained with a few heat transfer fluids according to the invention, in comparison with pure HFC-134a.

TABLE 1a performances obtained with a few binary mixtures according to the invention

| HFO-1234yf | HFC-134a | HFC-152a | HFO-1243zf | HFO-1234ze | Evaporator pressure (bar) | Condenser pressure (bar) | Pressure difference (bar) | Compression ratio | Speed of sound at compressor inlet (m/s) | Glide (° C.) | Molecular weight | Mach % M/M HFC-134a |
|---|---|---|---|---|---|---|---|---|---|---|---|---|
| | | | | | 3.4 | 9.4 | 6.0 | 2.8 | 148 | 0.0 | 102 | 100 |
| 15 | 85 | 0 | 0 | 0 | 3.5 | 9.5 | 6.1 | 2.7 | 146 | 0.1 | 104 | 101 |
| 5 | 95 | 0 | 0 | 0 | 3.4 | 9.4 | 6.0 | 2.8 | 148 | 0.1 | 103 | 100 |
| 80 | 0 | 20 | 0 | 0 | 3.6 | 9.3 | 5.7 | 2.6 | 148 | 0.0 | 104 | 101 |
| 70 | 0 | 30 | 0 | 0 | 3.6 | 9.3 | 5.7 | 2.3 | 153 | 0.1 | 100 | 97 |
| 0 | 40 | 60 | 0 | 0 | 3.3 | 9.3 | 5.9 | 2.8 | 150 | 0.1 | 98 | 99 |
| 20 | 0 | 0 | 80 | 0 | 3.2 | 8.4 | 5.2 | 2.6 | 149 | 0.1 | 100 | 100 |
| 10 | 0 | 0 | 90 | 0 | 3.2 | 8.3 | 5.1 | 2.6 | 151 | 0.1 | 98 | 99 |

TABLE 1b performances obtained with a few ternary mixtures according to the invention

| HFO-1234yf | HFC-134a | HFC-152a | HFO-1243zf | HFO-1234ze | Evaporator pressure (bar) | Condenser pressure (bar) | Pressure difference (bar) | Compression ratio | Speed of sound at compressor inlet (m/s) | Glide (° C.) | Molecular weight | Mach % M/M HFC-134a |
|---|---|---|---|---|---|---|---|---|---|---|---|---|
| | | | | | 3.4 | 9.4 | 6.0 | 2.8 | 148 | 0.0 | 102 | 100 |
| 75 | 5 | 20 | 0 | 0 | 3.6 | 9.3 | 5.7 | 2.6 | 148 | 0.0 | 104 | 100 |
| 70 | 10 | 20 | 0 | 0 | 3.6 | 9.4 | 5.7 | 2.6 | 149 | 0.0 | 103 | 100 |
| 65 | 20 | 15 | 0 | 0 | 3.6 | 9.4 | 5.8 | 2.6 | 147 | 0.0 | 104 | 101 |
| 60 | 20 | 20 | 0 | 0 | 3.6 | 9.4 | 5.8 | 2.6 | 150 | 0.1 | 102 | 99 |
| 55 | 30 | 15 | 0 | 0 | 3.6 | 9.5 | 5.8 | 2.6 | 148 | 0.1 | 103 | 100 |
| 40 | 50 | 10 | 0 | 0 | 3.6 | 9.5 | 5.9 | 2.7 | 148 | 0.1 | 103 | 100 |
| 38 | 50 | 12 | 0 | 0 | 3.6 | 9.5 | 5.9 | 2.7 | 149 | 0.2 | 102 | 100 |
| 33 | 60 | 7 | 0 | 0 | 3.6 | 9.6 | 6.0 | 2.7 | 147 | 0.2 | 103 | 101 |
| 30 | 60 | 10 | 0 | 0 | 3.5 | 9.5 | 6.0 | 2.7 | 149 | 0.2 | 102 | 100 |
| 35 | 5 | 0 | 60 | 0 | 3.3 | 8.7 | 5.4 | 2.6 | 146 | 0.1 | 103 | 101 |
| 25 | 5 | 0 | 70 | 0 | 3.3 | 8.6 | 5.4 | 2.7 | 148 | 0.1 | 101 | 100 |
| 15 | 5 | 0 | 80 | 0 | 3.2 | 8.5 | 5.3 | 2.7 | 150 | 0.1 | 99 | 99 |
| 30 | 10 | 0 | 60 | 0 | 3.3 | 8.8 | 5.5 | 2.7 | 147 | 0.1 | 102 | 101 |
| 20 | 10 | 0 | 70 | 0 | 3.3 | 8.7 | 5.5 | 2.7 | 149 | 0.1 | 100 | 100 |
| 30 | 20 | 0 | 50 | 0 | 3.4 | 9.1 | 5.7 | 2.7 | 147 | 0.1 | 103 | 101 |
| 20 | 20 | 0 | 60 | 0 | 3.3 | 9.0 | 5.7 | 2.7 | 148 | 0.1 | 101 | 100 |
| 10 | 20 | 0 | 70 | 0 | 3.3 | 8.9 | 5.6 | 2.7 | 150 | 0.1 | 99 | 99 |
| 20 | 30 | 0 | 50 | 0 | 3.4 | 9.2 | 5.8 | 2.7 | 148 | 0.1 | 101 | 100 |

TABLE 1b-continued performances obtained with a few ternary mixtures according to the invention

| HFO-1234yf | HFC-134a | HFC-152a | HFO-1243zf | HFO-1234ze | Evaporator pressure (bar) | Condenser pressure (bar) | Pressure difference (bar) | Compression ratio HFC-134a | Speed of sound at compressor inlet (m/s) | Glide (° C.) | Molecular weight | Mach % M/M (HFC-134a) |
|---|---|---|---|---|---|---|---|---|---|---|---|---|
| | | | | | 3.4 | 9.4 | 6.0 | 2.8 | 148 | 0.0 | 102 | 100 |
| 10 | 30 | 0 | 60 | 0 | 3.3 | 9.1 | 5.8 | 2.7 | 149 | 0.1 | 100 | 99 |
| 20 | 50 | 0 | 30 | 0 | 3.5 | 9.5 | 6.0 | 2.7 | 147 | 0.1 | 103 | 101 |
| 10 | 50 | 0 | 40 | 0 | 3.4 | 9.4 | 6.0 | 2.8 | 148 | 0.1 | 101 | 100 |

TABLE 1c performances obtained with a few ternary mixtures according to the invention

| HFO-1234yf | HFC-134a | HFC-152a | HFO-1243zf | HFO-1234ze | Evaporator pressure (bar) | Condenser pressure (bar) | Pressure difference (bar) | Compression ratio HFC-134a | Speed of sound at compressor inlet (m/s) | Glide (° C.) | Molecular weight | Mach % M/M (HFC-134a) |
|---|---|---|---|---|---|---|---|---|---|---|---|---|
| | | | | | 3.4 | 9.4 | 6.0 | 2.8 | 148 | 0.0 | 102 | 100 |
| 75 | 0 | 20 | 0 | 5 | 3.6 | 9.3 | 5.7 | 2.6 | 148 | 0.1 | 104 | 100 |
| 70 | 0 | 20 | 0 | 10 | 3.5 | 9.2 | 5.7 | 2.6 | 148 | 0.2 | 104 | 100 |
| 65 | 0 | 20 | 0 | 15 | 3.5 | 9.1 | 5.7 | 2.6 | 148 | 0.2 | 104 | 100 |
| 60 | 0 | 20 | 0 | 20 | 3.4 | 9.1 | 5.7 | 2.7 | 148 | 0.3 | 104 | 100 |
| 50 | 0 | 20 | 0 | 30 | 3.3 | 8.9 | 5.6 | 2.7 | 149 | 0.5 | 104 | 100 |
| 40 | 0 | 20 | 0 | 40 | 3.2 | 8.7 | 5.5 | 2.8 | 149 | 0.6 | 104 | 99 |
| 45 | 0 | 5 | 50 | 0 | 3.3 | 8.8 | 5.5 | 2.6 | 147 | 0.1 | 103 | 101 |
| 35 | 0 | 5 | 60 | 0 | 3.3 | 8.7 | 5.4 | 2.6 | 149 | 0.1 | 101 | 100 |
| 25 | 0 | 5 | 70 | 0 | 3.2 | 8.6 | 5.3 | 2.6 | 150 | 0.1 | 99 | 99 |
| 53 | 0 | 7 | 40 | 0 | 3.4 | 8.9 | 5.5 | 2.6 | 147 | 0.1 | 103 | 101 |
| 43 | 0 | 7 | 50 | 0 | 3.3 | 8.8 | 5.5 | 2.6 | 148 | 0.1 | 102 | 100 |
| 33 | 0 | 7 | 60 | 0 | 3.3 | 8.7 | 5.4 | 2.6 | 150 | 0.1 | 100 | 99 |
| 0 | 75 | 5 | 0 | 20 | 3.2 | 9.0 | 5.8 | 2.8 | 149 | 0.1 | 103 | 100 |
| 0 | 60 | 10 | 0 | 30 | 3.1 | 8.8 | 5.7 | 2.8 | 150 | 0.2 | 102 | 99 |

Example 2: Centrifugal Compressor Operating at Variable Speed

In this example, the same calculations as in example 1 are reproduced, but by considering that the speed of the centrifugal compressor may be adapted relative to the rotational speed with HFC-134a. Tables 2a, 2b and 2c summarize the performances obtained with a few heat transfer fluids according to the invention, in comparison with pure HFC-134a.

TABLE 2a performances obtained with a few binary mixtures according to the invention

| HFO-1234yf | HFC-134a | HFC-152a | HFO-1243zf | HFO-1234ze | Evaporator pressure (bar) | Condenser pressure (bar) | Pressure difference (bar) | Compression ratio | Speed of sound at compressor inlet (m/s) | Glide (° C.) | Molecular weight | Mach (speed adjustment) % M/M (HFC-134a) | % speed/speed HFC-134a |
|---|---|---|---|---|---|---|---|---|---|---|---|---|---|
| | | | | | 3.4 | 9.4 | 6.0 | 2.8 | 148 | 0.0 | 102 | 100 | 100 |
| 30 | 70 | 0 | 0 | 0 | 3.6 | 9.7 | 6.1 | 2.7 | 144 | 0.1 | 106 | 101 | 98 |
| 15 | 85 | 0 | 0 | 0 | 3.5 | 9.5 | 6.1 | 2.7 | 146 | 0.1 | 104 | 101 | 99 |
| 5 | 95 | 0 | 0 | 0 | 3.4 | 9.4 | 6.0 | 2.8 | 148 | 0.1 | 103 | 100 | 100 |
| 90 | 0 | 10 | 0 | 0 | 3.6 | 9.4 | 5.7 | 2.6 | 142 | 0.0 | 109 | 101 | 97 |
| 85 | 0 | 15 | 0 | 0 | 3.6 | 9.3 | 5.7 | 2.6 | 145 | 0.0 | 107 | 99 | 97 |
| 0 | 40 | 0 | 60 | 0 | 3.3 | 9.2 | 5.9 | 2.8 | 150 | 0.1 | 98 | 99 | 100 |
| 50 | 0 | 0 | 50 | 0 | 3.3 | 8.8 | 5.4 | 2.6 | 144 | 0.1 | 105 | 100 | 97 |
| 40 | 0 | 0 | 60 | 0 | 3.3 | 8.6 | 5.4 | 2.6 | 146 | 0.1 | 103 | 99 | 97 |

TABLE 2b performances obtained with a few ternary mixtures according to the invention

| HFO-1234yf | HFC-134a | HFC-152a | HFO-1243zf | HFO-1234ze | Evaporator pressure (bar) | Condenser pressure (bar) | Pressure difference (bar) | Compression ratio | Speed of sound at compressor inlet (m/s) HFC-134a | Glide (° C.) | Molecular weight | Mach (speed adjustment) % M/M (HFC-134a) | % speed/speed HFC-134a |
|---|---|---|---|---|---|---|---|---|---|---|---|---|---|
| | | | | | 3.4 | 9.4 | 6.0 | 2.8 | 148 | 0.0 | 102 | 100 | 100 |
| 85 | 5 | 10 | 0 | 0 | 3.6 | 9.4 | 5.8 | 2.6 | 143 | 0.0 | 109 | 101 | 93 |
| 80 | 5 | 15 | 0 | 0 | 3.6 | 9.4 | 5.7 | 2.6 | 145 | 0.0 | 106 | 99 | 93 |
| 80 | 10 | 10 | 0 | 0 | 3.6 | 9.4 | 5.8 | 2.6 | 143 | 0.0 | 108 | 100 | 94 |
| 78 | 10 | 12 | 0 | 0 | 3.6 | 9.4 | 5.8 | 2.6 | 144 | 0.0 | 107 | 99 | 94 |
| 73 | 20 | 7 | 0 | 0 | 3.7 | 9.5 | 5.8 | 2.6 | 142 | 0.0 | 108 | 101 | 94 |
| 72 | 20 | 8 | 0 | 0 | 3.7 | 9.5 | 5.8 | 2.6 | 143 | 0.0 | 108 | 100 | 94 |
| 70 | 20 | 10 | 0 | 0 | 3.7 | 9.5 | 5.8 | 2.6 | 144 | 0.0 | 107 | 100 | 94 |
| 65 | 30 | 5 | 0 | 0 | 3.7 | 9.6 | 5.9 | 2.6 | 142 | 0.0 | 108 | 101 | 94 |
| 63 | 30 | 7 | 0 | 0 | 3.7 | 9.6 | 5.9 | 2.6 | 144 | 0.0 | 107 | 100 | 94 |
| 62 | 30 | 8 | 0 | 0 | 3.7 | 9.5 | 5.9 | 2.6 | 144 | 0.0 | 107 | 100 | 94 |
| 60 | 30 | 10 | 0 | 0 | 3.6 | 9.5 | 5.9 | 2.6 | 145 | 0.0 | 106 | 99 | 94 |
| 45 | 50 | 5 | 0 | 0 | 3.6 | 9.6 | 6.0 | 2.6 | 145 | 0.1 | 106 | 100 | 96 |
| 37 | 60 | 3 | 0 | 0 | 3.6 | 9.6 | 6.0 | 2.7 | 145 | 0.1 | 105 | 101 | 96 |
| 35 | 60 | 5 | 0 | 0 | 3.6 | 9.6 | 6.0 | 2.7 | 146 | 0.2 | 104 | 100 | 97 |
| 33 | 60 | 7 | 0 | 0 | 3.6 | 9.6 | 6.0 | 2.7 | 147 | 0.2 | 103 | 99 | 97 |
| 55 | 5 | 0 | 40 | 0 | 3.4 | 9.0 | 5.6 | 2.6 | 143 | 0.1 | 106 | 101 | 95 |
| 45 | 5 | 0 | 50 | 0 | 3.3 | 8.8 | 5.5 | 2.6 | 145 | 0.1 | 104 | 100 | 96 |
| 35 | 5 | 0 | 60 | 0 | 3.3 | 8.7 | 5.4 | 2.6 | 146 | 0.1 | 103 | 99 | 96 |
| 50 | 10 | 0 | 40 | 0 | 3.4 | 9.0 | 5.6 | 2.7 | 144 | 0.1 | 106 | 101 | 96 |
| 40 | 10 | 0 | 50 | 0 | 3.4 | 8.9 | 5.6 | 2.7 | 145 | 0.1 | 104 | 100 | 96 |
| 30 | 10 | 0 | 60 | 0 | 3.3 | 8.8 | 5.5 | 2.7 | 147 | 0.1 | 102 | 99 | 96 |
| 40 | 20 | 0 | 40 | 0 | 3.4 | 9.2 | 5.8 | 2.7 | 145 | 0.1 | 104 | 101 | 97 |
| 30 | 20 | 0 | 50 | 0 | 3.4 | 9.1 | 5.7 | 2.7 | 147 | 0.1 | 103 | 100 | 97 |
| 20 | 20 | 0 | 60 | 0 | 3.3 | 9.0 | 5.7 | 2.7 | 148 | 0.1 | 101 | 99 | 98 |
| 40 | 30 | 0 | 30 | 0 | 3.5 | 9.4 | 5.9 | 2.7 | 145 | 0.1 | 105 | 101 | 97 |
| 30 | 30 | 0 | 40 | 0 | 3.4 | 9.3 | 5.9 | 2.7 | 146 | 0.1 | 103 | 101 | 98 |
| 20 | 30 | 0 | 50 | 0 | 3.4 | 9.2 | 5.8 | 2.7 | 148 | 0.1 | 101 | 100 | 99 |
| 10 | 30 | 0 | 60 | 0 | 3.3 | 9.1 | 5.8 | 2.7 | 149 | 0.1 | 100 | 99 | 99 |
| 30 | 50 | 0 | 20 | 0 | 3.5 | 9.6 | 6.0 | 2.7 | 145 | 0.1 | 104 | 101 | 98 |
| 20 | 50 | 0 | 30 | 0 | 3.5 | 9.5 | 6.0 | 2.7 | 147 | 0.1 | 103 | 101 | 99 |
| 10 | 50 | 0 | 40 | 0 | 3.4 | 9.4 | 6.0 | 2.8 | 148 | 0.1 | 101 | 100 | 100 |

TABLE 2c performances obtained with a few ternary mixtures according to the invention

| HFO-1234yf | HFC-134a | HFC-152a | HFO-1243zf | HFO-1234ze | Evaporator pressure (bar) | Condenser pressure (bar) | Pressure difference (bar) | Compression ratio | Speed of sound at compressor inlet (m/s) HFC-134a | Glide (° C.) | Molecular weight | Mach (speed adjustment) % M/M (HFC-134a) | % speed/speed HFC-134a |
|---|---|---|---|---|---|---|---|---|---|---|---|---|---|
| | | | | | 3.4 | 9.4 | 6.0 | 2.8 | 148 | 0.0 | 102 | 100 | 100 |
| 83 | 0 | 12 | 0 | 5 | 3.6 | 9.3 | 5.7 | 2.6 | 143 | 0.1 | 108 | 100 | 94 |
| 78 | 0 | 12 | 0 | 10 | 3.5 | 9.2 | 5.7 | 2.6 | 144 | 0.1 | 108 | 101 | 95 |
| 65 | 0 | 15 | 0 | 20 | 3.4 | 9.1 | 5.7 | 2.6 | 146 | 0.3 | 107 | 100 | 96 |
| 55 | 0 | 15 | 0 | 30 | 3.3 | 8.9 | 5.6 | 2.7 | 146 | 0.5 | 107 | 100 | 98 |
| 45 | 0 | 15 | 0 | 40 | 3.2 | 8.7 | 5.6 | 2.7 | 146 | 0.6 | 107 | 101 | 99 |
| 50 | 0 | 20 | 0 | 30 | 3.3 | 8.9 | 5.6 | 2.7 | 149 | 0.5 | 104 | 99 | 98 |
| 40 | 0 | 20 | 0 | 40 | 3.2 | 8.7 | 5.5 | 2.8 | 149 | 0.6 | 104 | 99 | 99 |
| 30 | 0 | 20 | 0 | 50 | 3.0 | 8.5 | 5.4 | 2.8 | 150 | 0.7 | 104 | 99 | 101 |
| 75 | 0 | 5 | 20 | 0 | 3.5 | 9.1 | 5.7 | 2.6 | 142 | 0.1 | 108 | 101 | 94 |
| 65 | 0 | 5 | 30 | 0 | 3.4 | 9.0 | 5.6 | 2.6 | 144 | 0.1 | 106 | 100 | 95 |
| 60 | 0 | 5 | 35 | 0 | 3.4 | 9.0 | 5.6 | 2.6 | 145 | 0.1 | 105 | 100 | 95 |
| 55 | 0 | 5 | 40 | 0 | 3.4 | 8.9 | 5.5 | 2.6 | 146 | 0.1 | 104 | 99 | 95 |
| 83 | 0 | 7 | 10 | 0 | 3.6 | 9.2 | 5.7 | 2.6 | 142 | 0.0 | 109 | 101 | 94 |
| 73 | 0 | 7 | 20 | 0 | 3.5 | 9.2 | 5.7 | 2.6 | 144 | 0.1 | 107 | 100 | 94 |
| 63 | 0 | 7 | 30 | 0 | 3.4 | 9.0 | 5.6 | 2.6 | 145 | 0.1 | 105 | 99 | 95 |
| 53 | 0 | 7 | 40 | 0 | 3.4 | 8.9 | 5.5 | 2.6 | 147 | 0.1 | 103 | 99 | 95 |

Embodiments

1. A process for cooling or heating a fluid or a body by means of a vapor compression circuit comprising a centrifugal compressor and containing a heat transfer fluid, the heat transfer fluid comprising at least two compounds chosen from 2,3,3,3-tetrafluoropropene, 1,3,3,3-tetrafluoropropene, 1,1,1,2-tetrafluoroethane, 1,1-difluoroethane and 3,3,3-trifluoropropene, wherein:

the ratio of the Mach number of the centrifugal compressor to the Mach number that the centrifugal compressor has, under the same operating conditions, when the heat transfer fluid is replaced by 1,1,1,2-tetrafluoroethane in the vapor compression circuit, is greater than or equal to 0.97 and less than or equal to 1.03;

the compression ratio of the centrifugal compressor is less than or equal to the compression ratio that the centrifugal compressor has, under the same operating conditions, when the heat transfer fluid is replaced by 1,1,1,2-tetrafluoroethane in the vapor compression circuit.

2. The process as recited in embodiment 1, wherein the heat transfer fluid comprises, preferably consists of, a mixture:
of 2,3,3,3-tetrafluoropropene and of 1,1,1,2-tetrafluoroethane; or
of 2,3,3,3-tetrafluoropropene and of 1,1-difluoroethane; or
of 2,3,3,3-tetrafluoropropene and of 3,3,3-trifluoropropene; or
of 1,3,3,3-tetrafluoropropene and of 3,3,3-trifluoropropene; or
of 1,1,1,2-tetrafluoroethane and of 3,3,3-trifluoropropene; or
of 2,3,3,3-tetrafluoropropene, of 1,3,3,3-tetrafluoropropene and of 1,1-difluoroethane;
of 2,3,3,3-tetrafluoropropene, of 1,1,1,2-tetrafluoroethane and of 1,1-difluoroethane; or
of 2,3,3,3-tetrafluoropropene, of 1,1,1,2-tetrafluoroethane and of 3,3,3-trifluoropropene; or
of 2,3,3,3-tetrafluoropropene, of 1,1-difluoroethane and of 3,3,3-trifluoropropene; or
of 1,3,3,3-tetrafluoropropene, of 1,1,1,2-tetrafluoroethane and of 1,1-difluoroethane; or
of 1,3,3,3-tetrafluoropropene, of 1,1-difluoroethane and of 3,3,3-trifluoropropene.

3. The process as recited in embodiment 1 or 2, wherein the vapor compression circuit comprises an evaporator and a condenser, and wherein:
the difference between the pressure at the condenser and the pressure at the evaporator is less than or equal to the difference between the pressure at the condenser and the pressure at the evaporator which is obtained, under the same operating conditions, when the heat transfer fluid is replaced by 1,1,1,2-tetrafluoroethane in the vapor compression circuit.

4. The process as recited in one of embodiments 1 to 3, wherein the centrifugal compressor is provided with rotational speed adaptation means, and wherein:
the rotational speed of the centrifugal compressor is less than or equal to the rotational speed that the centrifugal compressor has, under the same operating conditions, when the heat transfer fluid is replaced by 1,1,1,2-tetrafluoroethane in the vapor compression circuit.

5. The process as recited in embodiment 4, wherein the heat transfer fluid comprises:
from 2% to 50% of 2,3,3,3-tetrafluoropropene and from 50% to 98% of 1,1,1,2-tetrafluoroethane, preferably from 5% to 40% of 2,3,3,3-tetrafluoropropene and from 60% to 95% of 1,1,1,2-tetrafluoroethane, and more particularly preferably from 5% to 30% of 2,3,3,3-tetrafluoropropene and from 70% to 95% of 1,1,1,2-tetrafluoroethane; or
from 50% to 95% of 2,3,3,3-tetrafluoropropene and from 5% to 50% of 1,1-difluoroethane, preferably from 60% to 95% of 2,3,3,3-tetrafluoropropene and from 5% to 40% of 1,1-difluoroethane, and more particularly preferably from 85% to 90% of 2,3,3,3-tetrafluoropropene and from 10% to 15% of 1,1-difluoroethane; or from 10% to 70% of 2,3,3,3-tetrafluoropropene and from 30% to 90% of 3,3,3-trifluoropropene, preferably from 20% to 60% of 2,3,3,3-tetrafluoropropene and from 40% to 80% of 3,3,3-trifluoropropene, and more particularly preferably from 40% to 50% of 2,3,3,3-tetrafluoropropene and from 50% to 60% of 3,3,3-trifluoropropene; or from 20% to 70% of 1,3,3,3-tetrafluoropropene and from 30% to 80% of 3,3,3-trifluoropropene, preferably from 30% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 55% to 65% of 3,3,3-trifluoropropene; or from 10% to 90% of 2,3,3,3-tetrafluoropropene, from 5% to 70% of 1,3,3,3-tetrafluoropropene and from 5% to 30% of 1,1-difluoroethane, preferably from 20% to 85% of 2,3,3,3-tetrafluoropropene, from 5% to 60% of 1,3,3,3-tetrafluoropropene and from 10% to 20% of 1,1-difluoroethane, and more particularly preferably from 30% to 85% of 2,3,3,3-tetrafluoropropene, from 5% to 50% of 1,3,3,3-tetrafluoropropene and from 10% to 15% of 1,1-difluoroethane; or from 10% to 93% of 2,3,3,3-tetrafluoropropene, from 5% to 80% of 1,1,1,2-tetrafluoroethane and from 2% to 50% of 1,1-difluoroethane, preferably from 13% to 93% of 2,3,3,3-tetrafluoropropene, from 5% to 60% of 1,1,1,2-tetrafluoroethane and from 2% to 30% of 1,1-difluoroethane, and more particularly preferably from 25% to 92% of 2,3,3,3-tetrafluoropropene, from 5% to 60% of 1,1,1,2-tetrafluoroethane and from 3% to 15% of 1,1-difluoroethane; or from 5% to 90% of 2,3,3,3-tetrafluoropropene, from 5% to 60% of 1,1,1,2-tetrafluoroethane and from 5% to 70% of 3,3,3-trifluoropropene, preferably from 10% to 85% of 2,3,3,3-tetrafluoropropene, from 5% to 60% of 1,1,1,2-tetrafluoroethane and from 10% to 70% of 3,3,3-trifluoropropene, and more particularly preferably from 10% to 60% of 2,3,3,3-tetrafluoropropene, from 5% to 50% of 1,1,1,2-tetrafluoroethane and from 20% to 60% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene, preferably from 35% to 89% of 2,3,3,3-tetrafluoropropene, from 3% to 15% of 1,1-difluoroethane and from 8% to 50% of 3,3,3-trifluoropropene, and more particularly preferably from 50% to 85% of 2,3,3,3-tetrafluoropropene, from 5% to 10% of 1,1-difluoroethane and from 10% to 40% of 3,3,3-trifluoropropene; or from 10% to 60% of 1,3,3,3-tetrafluoropropene, from 20% to 87% of 1,1,1,2-tetrafluoroethane and from 3% to 20% of 1,1-difluoroethane, preferably from 10% to 40% of 1,3,3,3-tetrafluoropropene, from 45% to 87% of 1,1,1,2-tetrafluoroethane and from 3% to 15% of 1,1-difluoroethane, and more particularly preferably from 10% to 30% of 1,3,3,3-tetrafluoropropene, from 60% to 85% of 1,1,1,2-tetrafluoroethane and from 5% to 10% of 1,1-difluoroethane; or from 25% to 82% of 1,3,3,3-tetrafluoropropene, from 3% to 15% of 1,1-difluoroethane and from 15% to 60% of 3,3,3-trifluoropropene, preferably from 35% to 82% of 1,3,3,3-tetrafluoropropene, from 3% to 15% of 1,1-difluoroethane and from 15% to 50% of 3,3,3-trifluoropropene, and more particularly preferably from 40% to 75% of 1,3,3,3-tetrafluoropropene, from 5% to 10% of 1,1-difluoroethane and from 20% to 50% of 3,3,3-trifluoropropene.

6. The process as recited in one of embodiments 1 to 3, wherein the centrifugal compressor is devoid of rotational speed adaptation means.

7. The process as recited in embodiment 6, wherein the heat transfer fluid comprises:
from 2% to 50% of 2,3,3,3-tetrafluoropropene and from 50% to 98% of 1,1,1,2-tetrafluoroethane, preferably from 2% to 30% of 2,3,3,3-tetrafluoropropene and from 70% to 98% of 1,1,1,2-tetrafluoroethane, and more particularly preferably from 5% to 15% of 2,3,3,3-tetrafluoropropene and from 85% to 95% of 1,1,1,2-tetrafluoroethane; or
from 50% to 90% of 2,3,3,3-tetrafluoropropene and from 10% to 50% of 1,1-difluoroethane, preferably from 60% to 90% of 2,3,3,3-tetrafluoropropene and from 10% to 40% of 1,1-difluoroethane, and more particularly preferably from 70% to 80% of 2,3,3,3-tetrafluoropropene and from 20% to 30% of 1,1-difluoroethane; or
from 10% to 40% of 2,3,3,3-tetrafluoropropene and from 60% to 90% of 3,3,3-trifluoropropene, preferably from 10% to 30% of 2,3,3,3-tetrafluoropropene and from 70% to 90% of 3,3,3-trifluoropropene, and more particularly preferably from 10% to 20% of 2,3,3,3-tetrafluoropropene and from 80% to 90% of 3,3,3-trifluoropropene; or
from 20% to 70% of 1,3,3,3-tetrafluoropropene and from 30% to 80% of 3,3,3-trifluoropropene, preferably from 20% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or
from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 50% to 65% of 3,3,3-trifluoropropene; or
from 15% to 85% of 2,3,3,3-tetrafluoropropene, from 5% to 60% of 1,3,3,3-tetrafluoropropene and from 5% to 30% of 1,1-difluoroethane, preferably from 20% to 85% of 2,3,3,3-tetrafluoropropene, from 5% to 50% of 1,3,3,3-tetrafluoropropene and from 10% to 30% of 1,1-difluoroethane, and more particularly preferably from 35% to 80% of 2,3,3,3-tetrafluoropropene, from 5% to 40% of 1,3,3,3-tetrafluoropropene and from 15% to 25% of 1,1-difluoroethane; or
from 18% to 93% of 2,3,3,3-tetrafluoropropene, from 5% to 80% of 1,1,1,2-tetrafluoroethane and from 2% to 50% of 1,1-difluoroethane, preferably from 20% to 93% of 2,3,3,3-tetrafluoropropene, from 5% to 60% of 1,1,1,2-tetrafluoroethane and from 2% to 30% of 1,1-difluoroethane, and more particularly preferably from 30% to 88% of 2,3,3,3-tetrafluoropropene, from 5% to 60% of 1,1,1,2-tetrafluoroethane and from 7% to 20% of 1,1-difluoroethane; or
from 10% to 80% of 2,3,3,3-tetrafluoropropene, from 5% to 60% of 1,1,1,2-tetrafluoroethane and from 15% to 80% of 3,3,3-trifluoropropene, preferably from 10% to 75% of 2,3,3,3-tetrafluoropropene, from 5% to 60% of 1,1,1,2-tetrafluoroethane and from 20% to 80% of 3,3,3-trifluoropropene, and more particularly preferably from 10% to 65% of 2,3,3,3-tetrafluoropropene, from 5% to 50% of 1,1,1,2-tetrafluoroethane and from 30% to 80% of 3,3,3-trifluoropropene; or
from 10% to 78% of 2,3,3,3-tetrafluoropropene, from 3% to 15% of 1,1-difluoroethane and from 20% to 70% of 3,3,3-trifluoropropene, preferably from 15% to 67% of 2,3,3,3-tetrafluoropropene, from 3% to 10% of 1,1-difluoroethane and from 30% to 70% of 3,3,3-trifluoropropene, and more particularly preferably from 21% to 57% of 2,3,3,3-tetrafluoropropene, from 3% to 9% of 1,1-difluoroethane and from 40% to 70% of 3,3,3-trifluoropropene; or
from 15% to 60% of 1,3,3,3-tetrafluoropropene, from 20% to 82% of 1,1,1,2-tetrafluoroethane and from 3% to 20% of 1,1-difluoroethane, preferably from 15% to 50% of 1,3,3,3-tetrafluoropropene, from 35% to 82% of 1,1,1,2-tetrafluoroethane and from 3% to 15% of 1,1-difluoroethane, and more particularly preferably from 20% to 30% of 1,3,3,3-tetrafluoropropene, from 60% to 75% of 1,1,1,2-tetrafluoroethane and from 5% to 10% of 1,1-difluoroethane; or
from 35% to 77% of 1,3,3,3-tetrafluoropropene, from 3% to 15% of 1,1-difluoroethane and from 20% to 50% of 3,3,3-trifluoropropene, preferably from 35% to 72% of 1,3,3,3-tetrafluoropropene, from 3% to 15% of 1,1-difluoroethane and from 25% to 50% of 3,3,3-trifluoropropene, and more particularly preferably from 40% to 66% of 1,3,3,3-tetrafluoropropene, from 4% to 10% of 1,1-difluoroethane and from 30% to 50% of 3,3,3-trifluoropropene.

8. A process for cooling or heating a fluid or a body by means of a vapor compression circuit comprising a centrifugal compressor and containing a heat transfer fluid, the heat transfer fluid comprising, and preferably consisting of:
from 2% to 50% of 2,3,3,3-tetrafluoropropene and from 50% to 98% of 1,1,1,2-tetrafluoroethane; or
from 50% to 95% of 2,3,3,3-tetrafluoropropene and from 5% to 50% of 1,1-difluoroethane; or
from 10% to 70% of 2,3,3,3-tetrafluoropropene and from 30% to 90% of 3,3,3-trifluoropropene; or
from 20% to 70% of 1,3,3,3-tetrafluoropropene and from 30% to 80% of 3,3,3-trifluoropropene; or
from 10% to 70% of 1,1,1,2-tetrafluoroethane and from 30% to 90% of 3,3,3-trifluoropropene; or
from 10% to 90% of 2,3,3,3-tetrafluoropropene, from 5% to 70% of 1,3,3,3-tetrafluoropropene and from 5% to 30% of 1,1-difluoroethane; or
from 10% to 93% of 2,3,3,3-tetrafluoropropene, from 5% to 80% of 1,1,1,2-tetrafluoroethane and from 2% to 50% of 1,1-difluoroethane; or
from 5% to 90% of 2,3,3,3-tetrafluoropropene, from 5% to 60% of 1,1,1,2-tetrafluoroethane and from 5% to 80% of 3,3,3-trifluoropropene; or
from 10% to 89% of 2,3,3,3-tetrafluoropropene, from 3% to 20% of 1,1-difluoroethane and from 8% to 70% of 3,3,3-trifluoropropene; or
from 10% to 60% of 1,3,3,3-tetrafluoropropene, from 20% to 87% of 1,1,1,2-tetrafluoroethane and from 3% to 20% of 1,1-difluoroethane; or from 25% to 82% of 1,3,3,3-tetrafluoropropene, from 3% to 15% of 1,1-difluoroethane and from 15% to 60% of 3,3,3-trifluoropropene.

9. The process as recited in embodiment 8, wherein the heat transfer fluid comprises:
   from 2% to 30% of 2,3,3,3-tetrafluoropropene and from 70% to 98% of 1,1,1,2-tetrafluoroethane, preferably from 5% to 15% of 2,3,3,3-tetrafluoropropene and from 85% to 95% of 1,1,1,2-tetrafluoroethane; or
   from 5% to 40% of 2,3,3,3-tetrafluoropropene and from 60% to 95% of 1,1,1,2-tetrafluoroethane preferably from 5% to 30% of 2,3,3,3-tetrafluoropropene and from 70% to 95% of 1,1,1,2-tetrafluoroethane; or
   from 60% to 90% of 2,3,3,3-tetrafluoropropene and from 10% to 40% of 1,1-difluoroethane, preferably from 70% to 80% of 2,3,3,3-tetrafluoropropene and from 20% to 30% of 1,1-difluoroethane; or
   from 60% to 95% of 2,3,3,3-tetrafluoropropene and from 5% to 40% of 1,1-difluoroethane, preferably from 85% to 90% of 2,3,3,3-tetrafluoropropene and from 10% to 15% of 1,1-difluoroethane; or
   from 10% to 30% of 2,3,3,3-tetrafluoropropene and from 70% to 90% of 3,3,3-trifluoropropene, preferably from 10% to 20% of 2,3,3,3-tetrafluoropropene and from 80% to 90% of 3,3,3-trifluoropropene; or
   from 20% to 60% of 2,3,3,3-tetrafluoropropene and from 40% to 80% of 3,3,3-trifluoropropene, preferably from 40% to 50% of 2,3,3,3-tetrafluoropropene and from 50% to 60% of 3,3,3-trifluoropropene; or
   from 30% to 60% of 1,3,3,3-tetrafluoropropene and from 40% to 70% of 3,3,3-trifluoropropene, preferably from 30% to 50% of 1,3,3,3-tetrafluoropropene and from 50% to 70% of 3,3,3-trifluoropropene; or
   from 20% to 60% of 1,1,1,2-tetrafluoroethane and from 40% to 80% of 3,3,3-trifluoropropene, preferably from 35% to 50% of 1,1,1,2-tetrafluoroethane and from 50% to 65% of 3,3,3-trifluoropropene; or
   from 20% to 85% of 2,3,3,3-tetrafluoropropene, from 5% to 50% of 1,3,3,3-tetrafluoropropene and from 10% to 30% of 1,1-difluoroethane, preferably from 35% to 80% of 2,3,3,3-tetrafluoropropene, from 5% to 40% of 1,3,3,3-tetrafluoropropene, and from 15% to 25% of 1,1-difluoroethane; or
   from 20% to 85% of 2,3,3,3-tetrafluoropropene, from 5% to 60% of 1,3,3,3-tetrafluoropropene and from 10% to 20% of 1,1-difluoroethane, preferably from 30% to 85% of 2,3,3,3-tetrafluoropropene and from 5% to 50% of 1,3,3,3-tetrafluoropropene from 10% to 15% of 1,1-difluoroethane; or
   from 20% to 93% of 2,3,3,3-tetrafluoropropene, from 5% to 60% of 1,1,1,2-tetrafluoroethane and from 2% to 30% of 1,1-difluoroethane, preferably from 30% to 88% of 2,3,3,3-tetrafluoropropene, from 5% to 60% of 1,1,1,2-tetrafluoroethane and from 7% to 20% of 1,1-difluoroethane; or
   from 13% to 93% of 2,3,3,3-tetrafluoropropene, from 5% to 60% of 1,1,1,2-tetrafluoroethane and from 2% to 30% of 1,1-difluoroethane, preferably from 25% to 92% of 2,3,3,3-tetrafluoropropene, from 5% to 60% of 1,1,1,2-tetrafluoroethane and from 3% to 15% of 1,1-difluoroethane; or
   from 10% to 75% of 2,3,3,3-tetrafluoropropene, from 5% to 60% of 1,1,1,2-tetrafluoroethane and of 20% to 80% of 3,3,3-trifluoropropene, preferably from 10% to 65% of 2,3,3,3-tetrafluoropropene, from 5% to 50% of 1,1,1,2-tetrafluoroethane and from 30% to 80% of 3,3,3-trifluoropropene; or
   from 10% to 85% of 2,3,3,3-tetrafluoropropene, from 5% to 60% of 1,1,1,2-tetrafluoroethane and from 10% to 70% of 3,3,3-trifluoropropene, preferably from 10% to 60% of 2,3,3,3-tetrafluoropropene, from 5% to 50% of 1,1,1,2-tetrafluoroethane and from 20% to 60% of 3,3,3-trifluoropropene; or
   from 15% to 67% of 2,3,3,3-tetrafluoropropene, from 3% to 10% of 1,1-difluoroethane and from 30% to 70% of 3,3,3-trifluoropropene, preferably from 21% to 57% of 2,3,3,3-tetrafluoropropene, from 3% to 9% of 1,1-difluoroethane and from 40% to 70% of 3,3,3-trifluoropropene; or
   from 35% to 89% of 2,3,3,3-tetrafluoropropene, from 3% to 15% of 1,1-difluoroethane and from 8% to 50% of 3,3,3-trifluoropropene, preferably from 50% to 85% of 2,3,3,3-tetrafluoropropene, from 5% to 10% of 1,1-difluoroethane and from 10% to 40% from 3,3,3-trifluoropropene; or
   from 15% to 50% of 1,3,3,3-tetrafluoropropene, from 35% to 82% of 1,1,1,2-tetrafluoroethane and from 3% to 15% of 1,1-difluoroethane, preferably from 20% to 30% of 1,3,3,3-tetrafluoropropene, from 60% to 75% of 1,1,1,2-tetrafluoroethane and from 5% to 10% of 1,1-difluoroethane; or
   from 10% to 40% of 1,3,3,3-tetrafluoropropene, from 45% to 87% of 1,1,1,2-tetrafluoroethane and from 3% to 15% of 1,1-difluoroethane, preferably from 10% to 30% of 1,3,3,3-tetrafluoropropene, of 60% to 85% of 1,1,1,2-tetrafluoroethane and of 5% to 10% of 1,1-difluoroethane; or
   from 35% to 72% of 1,3,3,3-tetrafluoropropene, from 3% to 15% of 1,1-difluoroethane and from 25% to 50% of 3,3,3-trifluoropropene, preferably from 4% to 10% of 1,1-difluoroethane and from 30% to 50% of 3,3,3-trifluoropropene; or
   from 35% to 82% of 1,3,3,3-tetrafluoropropene, from 3% to 15% of 1,1-difluoroethane and from 15% to 50% of 3,3,3-trifluoropropene, preferably from 40% to 75% of 1,3,3,3-tetrafluoropropene, from 5% to 10% of 1,1-difluoroethane and from 20% to 50% of 3,3,3-trifluoropropene.

10. An installation for cooling or heating a fluid or a body comprising a vapor compression circuit comprising a centrifugal compressor and containing a heat transfer fluid, the heat transfer fluid comprising at least two compounds chosen from 2,3,3,3-tetrafluoropropene, 1,3,3,3-tetrafluoropropene, 1,1,1,2-tetrafluoroethane, 1,1-difluoroethane and 3,3,3-trifluoropropene, wherein:
    the ratio of the Mach number of the centrifugal compressor to the Mach number that the centrifugal compressor has, under the same operating conditions, when the heat transfer fluid is replaced by 1,1,1,2-tetrafluoroethane in the vapor compression circuit, is greater than or equal to 0.97 and less than or equal to 1.03;
    the compression ratio of the centrifugal compressor is less than or equal to the compression ratio that the centrifugal compressor has, under the same operating conditions, when the heat transfer fluid is replaced by 1,1,1,2-tetrafluoroethane in the vapor compression circuit.

11. The installation as recited in embodiment 10, wherein the heat transfer fluid comprises, preferably consists of, a mixture:
    of 2,3,3,3-tetrafluoropropene and of 1,1,1,2-tetrafluoroethane; or
    of 2,3,3,3-tetrafluoropropene and of 1,1-difluoroethane; or of 2,3,3,3-tetrafluoropropene and of 3,3,3-trifluoropropene; or of 1,3,3,3-tetrafluoropropene and of 3,3,3-trifluoropropene; or of 1,1,1,2-tetrafluoroethane and of 3,3,3-trifluoropropene; or of 2,3,3,3-tetrafluoropropene, of 1,3,3,3-tetrafluoropropene and of 1,1-difluoroethane;

of 2,3,3,3-tetrafluoropropene, of 1,1,1,2-tetrafluoroethane and of 1,1-difluoroethane; or of 2,3,3,3-tetrafluoropropene, of 1,1,1,2-tetrafluoroethane and of 3,3,3-trifluoropropene; or of 2,3,3,3-tetrafluoropropene, of 1,1-difluoroethane and of 3,3,3-trifluoropropene; or of 1,3,3,3-tetrafluoropropene, of 1,1,1,2-tetrafluoroethane and of 1,1-difluoroethane; or of 1,3,3,3-tetrafluoropropene, of 1,1-difluoroethane and of 3,3,3-trifluoropropene.

12. The installation as recited in embodiment 10 or 11, wherein the vapor compression circuit comprises an evaporator and a condenser, and wherein:

the difference between the pressure at the condenser and the pressure at the evaporator is less than or equal to the difference between the pressure at the condenser and the pressure at the evaporator which is obtained, under the same operating conditions, when the heat transfer fluid is replaced by 1,1,1,2-tetrafluoroethane in the vapor compression circuit.

13. The installation as recited in one of embodiments 10 to 12, wherein the centrifugal compressor is provided with rotational speed adaptation means, and wherein:

the rotational speed of the centrifugal compressor is less than or equal to the rotational speed that the centrifugal compressor has, under the same operating conditions, when the heat transfer fluid is replaced by 1,1,1,2-tetrafluoroethane in the vapor compression circuit.

14. The installation as recited in embodiment 13, wherein the heat transfer fluid comprises:

from 2% to 50% of 2,3,3,3-tetrafluoropropene and from 50% to 98% of 1,1,1,2-tetrafluoroethane, preferably from 5% to 40% of 2,3,3,3-tetrafluoropropene and from 60% to 95% of 1,1,1,2-tetrafluoroethane, and more particularly preferably from 5% to 30% of 2,3,3,3-tetrafluoropropene and from 70% to 95% of 1,1,1,2-tetrafluoroethane; or from 50% to 95% of 2,3,3,3-tetrafluoropropene and from 5% to 50% of 1,1-difluoroethane, preferably from 60% to 95% of 2,3,3,3-tetrafluoropropene and from 5% to 40% of 1,1-difluoroethane, and more particularly preferably from 85% to 90% of 2,3,3,3-tetrafluoropropene and from 10% to 15% of 1,1-difluoroethane; or from 10% to 70% of 2,3,3,3-tetrafluoropropene and from 30% to 90% of 3,3,3-trifluoropropene, preferably from 20% to 60% of 2,3,3,3-tetrafluoropropene and from 40% to 80% of 3,3,3-trifluoropropene, and more particularly preferably from 40% to 50% of 2,3,3,3-tetrafluoropropene and from 50% to 60% of 3,3,3-trifluoropropene; or from 20% to 70% of 1,3,3,3-tetrafluoropropene and from 30% to 80% of 3,3,3-trifluoropropene, preferably from 30% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 55% to 65% of 3,3,3-trifluoropropene; or from 10% to 90% of 2,3,3,3-tetrafluoropropene, from 5% to 70% of 1,3,3,3-tetrafluoropropene and from 5% to 30% of 1,1-difluoroethane, preferably from 20% to 85% of 2,3,3,3-tetrafluoropropene, from 5% to 60% of 1,3,3,3-tetrafluoropropene and from 10% to 20% of 1,1-difluoroethane, and more particularly preferably from 30% to 85% of 2,3,3,3-tetrafluoropropene, from 5% to 50% of 1,3,3,3-tetrafluoropropene and from 10% to 15% of 1,1-difluoroethane; or from 10% to 93% of 2,3,3,3-tetrafluoropropene, from 5% to 80% of 1,1,1,2-tetrafluoroethane and from 2% to 50% of 1,1-difluoroethane, preferably from 13% to 93% of 2,3,3,3-tetrafluoropropene, from 5% to 60% of 1,1,1,2-tetrafluoroethane and from 2% to 30% of 1,1-difluoroethane, and more particularly preferably from 25% to 92% of 2,3,3,3-tetrafluoropropene, from 5% to 60% of 1,1,1,2-tetrafluoroethane and from 3% to 15% of 1,1-difluoroethane; or from 5% to 90% of 2,3,3,3-tetrafluoropropene, from 5% to 60% of 1,1,1,2-tetrafluoroethane and from 5% to 70% of 3,3,3-trifluoropropene, preferably from 10% to 85% of 2,3,3,3-tetrafluoropropene, from 5% to 60% of 1,1,1,2-tetrafluoroethane and from 10% to 70% of 3,3,3-trifluoropropene, and more particularly preferably from 10% to 60% of 2,3,3,3-tetrafluoropropene, from 5% to 50% of 1,1,1,2-tetrafluoroethane and from 20% to 60% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene, preferably from 35% to 89% of 2,3,3,3-tetrafluoropropene, from 3% to 15% of 1,1-difluoroethane and from 8% to 50% of 3,3,3-trifluoropropene, and more particularly preferably from 50% to 85% of 2,3,3,3-tetrafluoropropene, from 5% to 10% of 1,1-difluoroethane and from 10% to 40% of 3,3,3-trifluoropropene; or from 10% to 60% of 1,3,3,3-tetrafluoropropene, from 20% to 87% of 1,1,1,2-tetrafluoroethane and from 3% to 20% of 1,1-difluoroethane, preferably from 10% to 40% of 1,3,3,3-tetrafluoropropene, from 45% to 87% of 1,1,1,2-tetrafluoroethane and from 3% to 15% of 1,1-difluoroethane, and more particularly preferably from 10% to 30% of 1,3,3,3-tetrafluoropropene, from 60% to 85% of 1,1,1,2-tetrafluoroethane and from 5% to 10% of 1,1-difluoroethane; or from 25% to 82% of 1,3,3,3-tetrafluoropropene, from 3% to 15% of 1,1-difluoroethane and from 15% to 60% of 3,3,3-trifluoropropene, preferably from 35% to 82% of 1,3,3,3-tetrafluoropropene, from 3% to 15% of 1,1-difluoroethane and from 15% to 50% of 3,3,3-trifluoropropene, and more particularly preferably from 40% to 75% of 1,3,3,3-tetrafluoropropene, from 5% to 10% of 1,1-difluoroethane and from 20% to 50% of 3,3,3-trifluoropropene.

15. The installation as recited in one of embodiments 10 to 12, wherein the centrifugal compressor is devoid of rotational speed adaptation means.

16. The installation as recited in embodiment 15, wherein the heat transfer fluid comprises:

from 2% to 50% of 2,3,3,3-tetrafluoropropene and from 50% to 98% of 1,1,1,2-tetrafluoroethane, preferably from 2% to 30% of 2,3,3,3-tetrafluoropropene and from 70% to 98% of 1,1,1,2-tetrafluoroethane, and more particularly preferably from 5% to 15% of 2,3,3,3-tetrafluoropropene and from 85% to 95% of 1,1,1,2-tetrafluoroethane; or from 50% to 90% of 2,3,3,3-tetrafluoropropene and from 10% to 50% of 1,1-difluoroethane, preferably from 60% to 90% of 2,3,3,3-tetrafluoropropene and from 10% to 40% of 1,1-difluoroethane, and more particularly preferably from 70% to 80% of 2,3,3,3-tetrafluoropropene and from 20% to 30% of 1,1-difluoroethane; or from 10% to 40% of 2,3,3,3-tetrafluoropropene and from 60% to 90% of 3,3,3-trifluoropropene, preferably from 10% to 30% of 2,3,3,3-tetrafluoropropene and from 70% to 90% of 3,3,3-trifluoropropene, and more particularly preferably from 10% to 20% of 2,3,3,3-tetrafluoropropene and from 80% to 90% of 3,3,3-trifluoropropene; or from 20% to 70% of 1,3,3,3-tetrafluoropropene and from 30% to 80% of 3,3,3-trifluoropropene, preferably from 20% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 50% to 65% of 3,3,3-trifluoropropene; or from 15% to 85% of 2,3,3,3-tetrafluoropropene, from 5% to 60% of 1,3,3,3-tetrafluoropropene and from 5% to 30% of 1,1-difluoroethane, preferably from 20% to 85% of 2,3,3,3-tetrafluoropropene, from 5% to 50% of 1,3,3,3-tetrafluoropropene and from 10% to 30% of 1,1-difluoroethane, and more particularly preferably from 35% to 80% of 2,3,3,3-tetrafluoropropene, from 5% to 40% of 1,3,3,3-tetrafluoropropene and from 15% to 25% of 1,1-difluoroethane; or from 18% to 93% of 2,3,3,3-tetrafluoropropene, from 5% to 80% of 1,1,1,2-tetrafluoroethane and from 2% to 50% of 1,1-difluoroethane, preferably from 20% to 93% of 2,3,3,3-tetrafluoropropene, from 5% to 60% of 1,1,1,2-tetrafluoroethane and from 2% to 30% of 1,1-difluoroethane, and more particularly preferably from 30% to 88% of 2,3,3,3-tetrafluoropropene, from 5% to 60% of 1,1,1,2-tetrafluoroethane and from 7% to 20% of 1,1-difluoroethane; or from 10% to 80% of 2,3,3,3-tetrafluoropropene, from 5% to 60% of 1,1,1,2-tetrafluoroethane and from 15% to 80% of 3,3,3-trifluoropropene, preferably from 10% to 75% of 2,3,3,3-tetrafluoropropene, from 5% to 60% of 1,1,1,2-tetrafluoroethane and from 20% to 80% of 3,3,3-trifluoropropene, and more particularly preferably from 10% to 65% of 2,3,3,3-tetrafluoropropene, from 5% to 50% of 1,1,1,2-tetrafluoroethane and from 30% to 80% of 3,3,3-trifluoropropene; or from 10% to 78% of 2,3,3,3-tetrafluoropropene, from 3% to 15% of 1,1-difluoroethane and from 20% to 70% of 3,3,3-trifluoropropene, preferably from 15% to 67% of 2,3,3,3-tetrafluoropropene, from 3% to 10% of 1,1-difluoroethane and from 30% to 70% of 3,3,3-trifluoropropene, and more particularly preferably from 21% to 57% of 2,3,3,3-tetrafluoropropene, from 3% to 9% of 1,1-difluoroethane and from 40% to 70% of 3,3,3-trifluoropropene; or from 15% to 60% of 1,3,3,3-tetrafluoropropene, from 20% to 82% of 1,1,1,2-tetrafluoroethane and from 3% to 20% of 1,1-difluoroethane, preferably from 15% to 50% of 1,3,3,3-tetrafluoropropene, from 35% to 82% of 1,1,1,2-tetrafluoroethane and from 3% to 15% of 1,1-difluoroethane, and more particularly preferably from 20% to 30% of 1,3,3,3-tetrafluoropropene, from 60% to 75% of 1,1,1,2-tetrafluoroethane and from 5% to 10% of 1,1-difluoroethane; or from 35% to 77% of 1,3,3,3-tetrafluoropropene, from 3% to 15% of 1,1-difluoroethane and from 20% to 50% of 3,3,3-trifluoropropene, preferably from 35% to 72% of 1,3,3,3-tetrafluoropropene, from 3% to 15% of 1,1-difluoroethane and from 25% to 50% of 3,3,3-trifluoropropene, and more particularly preferably from 40% to 66% of 1,3,3,3-tetrafluoropropene, from 4% to 10% of 1,1-difluoroethane and from 30% to 50% of 3,3,3-trifluoropropene.

17. An installation for cooling or heating a fluid or a body comprising a vapor compression circuit comprising a centrifugal compressor and containing a heat transfer fluid, wherein the heat transfer fluid comprises, preferably consists of:

from 2% to 50% of 2,3,3,3-tetrafluoropropene and from 50% to 98% of 1,1,1,2-tetrafluoroethane; or from 50% to 95% of 2,3,3,3-tetrafluoropropene and from 5% to 50% of 1,1-difluoroethane; or from 10% to 70% of 2,3,3,3-tetrafluoropropene and from 30% to 90% of 3,3,3-trifluoropropene; or from 20% to 70% of 1,3,3,3-tetrafluoropropene and from 30% to 80% of 3,3,3-trifluoropropene; or from 10% to 70% of 1,1,1,2-tetrafluoroethane and from 30% to 90% of 3,3,3-trifluoropropene; or from 10% to 90% of 2,3,3,3-tetrafluoropropene, from 5% to 70% of 1,3,3,3-tetrafluoropropene and from 5% to 30% of 1,1-difluoroethane; or from 10% to 93% of 2,3,3,3-tetrafluoropropene, from 5% to 80% of 1,1,1,2-tetrafluoroethane and from 2% to 50% of 1,1-difluoroethane; or from 5% to 90% of 2,3,3,3-tetrafluoropropene, from 5% to 60% of 1,1,1,2-tetrafluoroethane and from 5% to 80% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene; or from 10% to 60% of 1,3,3,3-tetrafluoropropene, from 20% to 87% of 1,1,1,2-tetrafluoroethane and from 3% to 20% of 1,1-difluoroethane; or from 25% to 82% of 1,3,3,3-tetrafluoropropene, from 3% to 15% of 1,1-difluoroethane and from 15% to 60% of 3,3,3-trifluoropropene.

18. The installation as recited in embodiment 17, wherein the heat transfer fluid comprises:

from 2% to 30% of 2,3,3,3-tetrafluoropropene and from 70% to 98% of 1,1,1,2-tetrafluoroethane, preferably from 5% to 15% of 2,3,3,3-tetrafluoropropene and from 85% to 95% of 1,1,1,2-tetrafluoroethane; or from 5% to 40% of 2,3,3,3-tetrafluoropropene and from 60% to 95% of 1,1,1,2-tetrafluoroethane preferably from 5% to 30% of 2,3,3,3-tetrafluoropropene and from 70% to 95% of 1,1,1,2-tetrafluoroethane; or from 60% to 90% of 2,3,3,3-tetrafluoropropene and from 10% to 40% of 1,1-difluoroethane, preferably from 70% to 80% of 2,3,3,3-tetrafluoropropene and from 20% to 30% of 1,1-difluoroethane; or from 60% to 95% of 2,3,3,3-tetrafluoropropene and from 5% to 40% of 1,1-difluoroethane, preferably from 85% to 90% of 2,3,3,3-tetrafluoropropene and from 10% to 15% of 1,1-difluoroethane; or from 10% to 30% of 2,3,3,3-tetrafluoropropene and from 70% to 90% of 3,3,3-trifluoropropene, preferably from 10% to 20% of 2,3,3,3-tetrafluoropropene and from 80% to 90% of 3,3,3-trifluoropropene; or from 20% to 60% of 2,3,3,3-tetrafluoropropene and from 40% to 80% of 3,3,3-trifluoropropene, preferably from 40% to 50% of 2,3,3,3-tetrafluoropropene and from 50% to 60% of 3,3,3-trifluoropropene; or from 30% to 60% of 1,3,3,3-tetrafluoropropene and from 40% to 70% of 3,3,3-trifluoropropene, preferably from 30% to 50% of 1,3,3,3-tetrafluoropropene and from 50% to 70% of 3,3,3-trifluoropropene; or from 20% to 60% of 1,1,1,2-tetrafluoroethane and from 40% to 80% of 3,3,3-trifluoropropene, preferably from 35% to 50% of 1,1,1,2-tetrafluoroethane and from 50% to 65% of 3,3,3-trifluoropropene; or from 20% to 85% of 2,3,3,3-tetrafluoropropene, from 5% to 50% of 1,3,3,3-tetrafluoropropene and from 10% to 30% of 1,1-difluoroethane, preferably from 35% to 80% of 2,3,3,3-tetrafluoropropene, from 5% to 40% of 1,3,3,3-tetrafluoropropene and from 15% to 25% of 1,1-difluoroethane; or from 20% to 85% of 2,3,3,3-tetrafluoropropene, from 5% to 60% of 1,3,3,3-tetrafluoropropene and from 10% to 20% of 1,1-difluoroethane, preferably from 30% to 85% of 2,3,3,3-tetrafluoropropene, from 5% to 50% of 1,3,3,3-tetrafluoropropene and from 10% to 15% of 1,1-difluoroethane; or from 20% to 93% of 2,3,3,3-tetrafluoropropene, from 5% to 60% of 1,1,1,2-tetrafluoroethane and from 2% to 30% of 1,1-difluoroethane, preferably from 30% to 88% of 2,3,3,3-tetrafluoropropene, from 5% to 60% of 1,1,1,2-tetrafluoroethane and from 7% to 20% of 1,1-difluoroethane; or from 13% to 93% of 2,3,3,3-tetrafluoropropene, from 5% to 60% of 1,1,1,2-tetrafluoroethane and from 2% to 30% of 1,1-difluoroethane, preferably from 25% to 92% of 2,3,3,3-tetrafluoropropene, from 5% to 60% of 1,1,1,2-tetrafluoroethane and from 3% to 15% of 1,1-difluoroethane; or from 10% to 75% of 2,3,3,3-tetrafluoropropene, from 5% to 60% of 1,1,1,2-tetrafluoroethane and of 20% to 80% of 3,3,3-trifluoropropene, preferably from 10% to 65% of 2,3,3,3-tetrafluoropropene, from 5% to 50% of 1,1,1,2-tetrafluoroethane and from 30% to 80% of 3,3,3-trifluoropropene; or from 10% to 85% of 2,3,3,3-tetrafluoropropene, from 5% to 60% of 1,1,1,2-tetrafluoroethane and from 10% to 70% of 3,3,3-trifluoropropene, preferably from 10% to 60% of 2,3,3,3-tetrafluoropropene, from 5% to 50% of 1,1,1,2-tetrafluoroethane and from 20% to 60% of 3,3,3-trifluoropropene; or from 15% to 67% of 2,3,3,3-tetrafluoropropene, from 3% to 10% of 1,1-difluoroethane and of 30% to 70% of 3,3,3-trifluoropropene, preferably from 21% to 57% of 2,3,3,3-tetrafluoropropene, from 3% to 9% of 1,1-difluoroethane and from 40% to 70% of 3,3,3-trifluoropropene; or from 35% to 89% of 2,3,3,3-tetrafluoropropene, from 3% to 15% of 1,1-difluoroethane and from 8% to 50% of 3,3,3-trifluoropropene, preferably from 50% to 85% of 2,3,3,3-tetrafluoropropene, from 5% to 10% of 1,1-difluoroethane and from 10% to 40% of 3,3,3-trifluoropropene; or from 15% to 50% of 1,3,3,3-tetrafluoropropene, from 35% to 82% of 1,1,1,2-tetrafluoroethane and from 3% to 15% of 1,1-difluoroethane, preferably from 20% to 30% of 1,3,3,3-tetrafluoropropene, from 60% to 75% of 1,1,1,2-tetrafluoroethane and from 5% to 10% of 1,1-difluoroethane; or from 10% to 40% of 1,3,3,3-tetrafluoropropene, from 45% to 87% of 1,1,1,2-tetrafluoroethane and from 3% to 15% of 1,1-difluoroethane, preferably from 10% to 30% of 1,3,3,3-tetrafluoropropene, of 60% to 85% of 1,1,1,2-tetrafluoroethane and of 5% to 10% of 1,1-difluoroethane; or from 35% to 72% of 1,3,3,3-tetrafluoropropene, from 3% to 15% of 1,1-difluoroethane and from 25% to 50% of 3,3,3-trifluoropropene, preferably from 40% to 66% of 1,3,3,3-tetrafluoropropene, 4% to 10% of 1,1-difluoroethane and from 30% to 50% of 3,3,3-trifluoropropene; or from 35% to 82% of 1,3,3,3-tetrafluoropropene, from 3% to 15% of 1,1-difluoroethane and from 15% to 50% of 3,3,3-trifluoropropene, preferably from 40% to 75% of 1,3,3,3-tetrafluoropropene, from 5% to 10% of 1,1-difluoroethane and from 20% to 50% of 3,3,3-trifluoropropene.

19. The installation as recited in one of embodiments 10 to 18, which is a mobile or stationary air-conditioning installation, preferably a stationary air-conditioning installation.

20. A process for converting a vapor compression circuit comprising:
   the provision of an initial vapor compression circuit comprising a centrifugal compressor and containing 1,1,1,2-tetrafluoroethane as heat transfer fluid; and
   the replacement of the 1,1,1,2-tetrafluoroethane with a substitute heat transfer fluid in order to provide a final vapor compression circuit;
   wherein the substitute heat transfer fluid comprises at least two compounds chosen from 2,3,3,3-tetrafluoropropene, 1,3,3,3-tetrafluoropropene, 1,1,1,2-tetrafluoroethane, 1,1-difluoroethane and 3,3,3-trifluoropropene, and wherein:
   the ratio of the Mach number of the centrifugal compressor in the final vapor compression circuit to the Mach number of the centrifugal compressor in the initial vapor compression circuit, under the same operating conditions, is greater than or equal to 0.97 and less than or equal to 1.03; and
   the compression ratio of the centrifugal compressor in the final vapor compression circuit is less than or equal to the compression ratio of the centrifugal compressor in the initial vapor compression circuit, under the same operating conditions.

21. The process as recited in embodiment 20, wherein the substitute heat transfer fluid comprises, preferably consists of, a mixture:
   of 2,3,3,3-tetrafluoropropene and of 1,1,1,2-tetrafluoroethane; or
   of 2,3,3,3-tetrafluoropropene and of 1,1-difluoroethane; or
   of 2,3,3,3-tetrafluoropropene and of 3,3,3-trifluoropropene; or
   of 1,3,3,3-tetrafluoropropene and of 3,3,3-trifluoropropene; or
   of 1,1,1,2-tetrafluoroethane and of 3,3,3-trifluoropropene; or
   of 2,3,3,3-tetrafluoropropene, of 1,3,3,3-tetrafluoropropene and of 1,1-difluoroethane;

of 2,3,3,3-tetrafluoropropene, of 1,1,1,2-tetrafluoroethane and of 1,1-difluoroethane; or of 2,3,3,3-tetrafluoropropene, of 1,1,1,2-tetrafluoroethane and of 3,3,3-trifluoropropene; or of 2,3,3,3-tetrafluoropropene, of 1,1-difluoroethane and of 3,3,3-trifluoropropene; or of 1,3,3,3-tetrafluoropropene, of 1,1,1,2-tetrafluoroethane and of 1,1-difluoroethane; or of 1,3,3,3-tetrafluoropropene, of 1,1-difluoroethane and of 3,3,3-trifluoropropene.

22. The process as recited in embodiment 20 or 21, wherein the initial vapor compression circuit comprises an evaporator and a condenser, and wherein:

the difference between the pressure at the condenser and the pressure at the evaporator in the final vapor compression circuit is less than or equal to the difference between the pressure at the condenser and the pressure at the evaporator in the initial vapor compression circuit, under the same operating conditions.

23. The process as recited in one of embodiments 20 to 22, wherein the centrifugal compressor is provided with rotational speed adaptation means, and wherein:

the rotational speed of the centrifugal compressor in the final vapor compression circuit is adjusted to a value less than or equal to the rotational speed of the centrifugal compressor in the initial vapor compression circuit, under the same operating conditions.

24. The process as recited in embodiment 23, wherein the substitute heat transfer fluid comprises:

from 2% to 50% of 2,3,3,3-tetrafluoropropene and from 50% to 98% of 1,1,1,2-tetrafluoroethane, preferably from 5% to 40% of 2,3,3,3-tetrafluoropropene and from 60% to 95% of 1,1,1,2-tetrafluoroethane, and more particularly preferably from 5% to 30% of 2,3,3,3-tetrafluoropropene and from 70% to 95% of 1,1,1,2-tetrafluoroethane; or from 50% to 95% of 2,3,3,3-tetrafluoropropene and from 5% to 50% of 1,1-difluoroethane, preferably from 60% to 95% of 2,3,3,3-tetrafluoropropene and from 5% to 40% of 1,1-difluoroethane, and more particularly preferably from 85% to 90% of 2,3,3,3-tetrafluoropropene and from 10% to 15% of 1,1-difluoroethane; or from 10% to 70% of 2,3,3,3-tetrafluoropropene and from 30% to 90% of 3,3,3-trifluoropropene, preferably from 20% to 60% of 2,3,3,3-tetrafluoropropene and from 40% to 80% of 3,3,3-trifluoropropene, and more particularly preferably from 40% to 50% of 2,3,3,3-tetrafluoropropene and from 50% to 60% of 3,3,3-trifluoropropene; or from 20% to 70% of 1,3,3,3-tetrafluoropropene and from 30% to 80% of 3,3,3-trifluoropropene, preferably from 30% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 55% to 65% of 3,3,3-trifluoropropene; or from 10% to 90% of 2,3,3,3-tetrafluoropropene, from 5% to 70% of 1,3,3,3-tetrafluoropropene and from 5% to 30% of 1,1-difluoroethane, preferably from 20% to 85% of 2,3,3,3-tetrafluoropropene, from 5% to 60% of 1,3,3,3-tetrafluoropropene and from 10% to 20% of 1,1-difluoroethane, and more particularly preferably from 30% to 85% of 2,3,3,3-tetrafluoropropene, from 5% to 50% of 1,3,3,3-tetrafluoropropene and from 10% to 15% of 1,1-difluoroethane; or from 10% to 93% of 2,3,3,3-tetrafluoropropene, from 5% to 80% of 1,1,1,2-tetrafluoroethane and from 2% to 50% of 1,1-difluoroethane, preferably from 13% to 93% of 2,3,3,3-tetrafluoropropene, from 5% to 60% of 1,1,1,2-tetrafluoroethane and from 2% to 30% of 1,1-difluoroethane, and more particularly preferably from 25% to 92% of 2,3,3,3-tetrafluoropropene, from 5% to 60% of 1,1,1,2-tetrafluoroethane and from 3% to 15% of 1,1-difluoroethane; or from 5% to 90% of 2,3,3,3-tetrafluoropropene, from 5% to 60% of 1,1,1,2-tetrafluoroethane and from 5% to 70% of 3,3,3-trifluoropropene, preferably from 10% to 85% of 2,3,3,3-tetrafluoropropene, from 5% to 60% of 1,1,1,2-tetrafluoroethane and from 10% to 70% of 3,3,3-trifluoropropene, and more particularly preferably from 10% to 60% of 2,3,3,3-tetrafluoropropene, from 5% to 50% of 1,1,1,2-tetrafluoroethane and from 20% to 60% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene, preferably from 35% to 89% of 2,3,3,3-tetrafluoropropene, from 3% to 15% of 1,1-difluoroethane and from 8% to 50% of 3,3,3-trifluoropropene, and more particularly preferably from 50% to 85% of 2,3,3,3-tetrafluoropropene, from 5% to 10% of 1,1-difluoroethane and from 10% to 40% of 3,3,3-trifluoropropene; or from 10% to 60% of 1,3,3,3-tetrafluoropropene, from 20% to 87% of 1,1,1,2-tetrafluoroethane and from 3% to 20% of 1,1-difluoroethane, preferably from 10% to 40% of 1,3,3,3-tetrafluoropropene, from 45% to 87% of 1,1,1,2-tetrafluoroethane and from 3% to 15% of 1,1-difluoroethane, and more particularly preferably from 10% to 30% of 1,3,3,3-tetrafluoropropene, from 60% to 85% of 1,1,1,2-tetrafluoroethane and from 5% to 10% of 1,1-difluoroethane; or from 25% to 82% of 1,3,3,3-tetrafluoropropene, from 3% to 15% of 1,1-difluoroethane and from 15% to 60% of 3,3,3-trifluoropropene, preferably from 35% to 82% of 1,3,3,3-tetrafluoropropene, from 3% to 15% of 1,1-difluoroethane and from 15% to 50% of 3,3,3-trifluoropropene, and more particularly preferably from 40% to 75% of 1,3,3,3-tetrafluoropropene, from 5% to 10% of 1,1-difluoroethane and from 20% to 50% of 3,3,3-trifluoropropene.

25. The process as recited in one of embodiments 20 to 22, wherein the centrifugal compressor is devoid of rotational speed adaptation means.

26. The process as recited in embodiment 25, wherein the substitute heat transfer fluid comprises:

from 2% to 50% of 2,3,3,3-tetrafluoropropene and from 50% to 98% of 1,1,1,2-tetrafluoroethane, preferably from 2% to 30% of 2,3,3,3-tetrafluoropropene and from 70% to 98% of 1,1,1,2-tetrafluoroethane, and more particularly preferably from 5% to 15% of 2,3,3,3-tetrafluoropropene and from 85% to 95% of 1,1,1,2-tetrafluoroethane; or from 50% to 90% of 2,3,3,3-tetrafluoropropene and from 10% to 50% of 1,1-difluoroethane, preferably from 60% to 90% of 2,3,3,3-tetrafluoropropene and from 10% to 40% of 1,1-difluoroethane, and more particularly preferably from 70% to 80% of 2,3,3,3-tetrafluoropropene and from 20% to 30% of 1,1-difluoroethane; or from 10% to 40% of 2,3,3,3-tetrafluoropropene and from 60% to 90% of 3,3,3-trifluoropropene, preferably from 10% to 30% of 2,3,3,3-tetrafluoropropene and from 70% to 90% of 3,3,3-trifluoropropene, and more particularly preferably from 10% to 20% of 2,3,3,3-tetrafluoropropene and from 80% to 90% of 3,3,3-trifluoropropene; or from 20% to 70% of 1,3,3,3-tetrafluoropropene and from 30% to 80% of 3,3,3-trifluoropropene, preferably from 20% to 60% of 1,3,3,3-tetrafluoropropene and from 40% to 70% of 3,3,3-trifluoropropene, and more particularly preferably from 30% to 50% of 1,3,3,3-tetrafluoropropene and from 50% to 70% of 3,3,3-trifluoropropene; or from 10% to 70% of 1,1,1,2-tetrafluoroethane and from 30% to 90% of 3,3,3-trifluoropropene, preferably from 20% to 60% of 1,1,1,2-tetrafluoroethane and from 40% to 80% of 3,3,3-trifluoropropene, and more particularly preferably from 35% to 50% of 1,1,1,2-tetrafluoroethane and from 50% to 65% of 3,3,3-trifluoropropene; or from 15% to 85% of 2,3,3,3-tetrafluoropropene, from 5% to 60% of 1,3,3,3-tetrafluoropropene and from 5% to 30% of 1,1-difluoroethane, preferably from 20% to 85% of 2,3,3,3-tetrafluoropropene, from 5% to 50% of 1,3,3,3-tetrafluoropropene and from 10% to 30% of 1,1-difluoroethane, and more particularly preferably from 35% to 80% of 2,3,3,3-tetrafluoropropene, from 5% to 40% of 1,3,3,3-tetrafluoropropene and from 15% to 25% of 1,1-difluoroethane; or from 18% to 93% of 2,3,3,3-tetrafluoropropene, from 5% to 80% of 1,1,1,2-tetrafluoroethane and from 2% to 50% of 1,1-difluoroethane, preferably from 20% to 93% of 2,3,3,3-tetrafluoropropene, from 5% to 60% of 1,1,1,2-tetrafluoroethane and from 2% to 30% of 1,1-difluoroethane, and more particularly preferably from 30% to 88% of 2,3,3,3-tetrafluoropropene, from 5% to 60% of 1,1,1,2-tetrafluoroethane and from 7% to 20% of 1,1-difluoroethane; or from 10% to 80% of 2,3,3,3-tetrafluoropropene, from 5% to 60% of 1,1,1,2-tetrafluoroethane and from 15% to 80% of 3,3,3-trifluoropropene, preferably from 10% to 75% of 2,3,3,3-tetrafluoropropene, from 5% to 60% of 1,1,1,2-tetrafluoroethane and from 20% to 80% of 3,3,3-trifluoropropene, and more particularly preferably from 10% to 65% of 2,3,3,3-tetrafluoropropene, from 5% to 50% of 1,1,1,2-tetrafluoroethane and from 30% to 80% of 3,3,3-trifluoropropene; or from 10% to 78% of 2,3,3,3-tetrafluoropropene, from 3% to 15% of 1,1-difluoroethane and from 20% to 70% of 3,3,3-trifluoropropene, preferably from 15% to 67% of 2,3,3,3-tetrafluoropropene, from 3% to 10% of 1,1-difluoroethane and from 30% to 70% of 3,3,3-trifluoropropene, and more particularly preferably from 21% to 57% of 2,3,3,3-tetrafluoropropene, from 3% to 9% of 1,1-difluoroethane and from 40% to 70% of 3,3,3-trifluoropropene; or from 15% to 60% of 1,3,3,3-tetrafluoropropene, from 20% to 82% of 1,1,1,2-tetrafluoroethane and from 3% to 20% of 1,1-difluoroethane, preferably from 15% to 50% of 1,3,3,3-tetrafluoropropene, from 35% to 82% of 1,1,1,2-tetrafluoroethane and from 3% to 15% of 1,1-difluoroethane, and more particularly preferably from 20% to 30% of 1,3,3,3-tetrafluoropropene, from 60% to 75% of 1,1,1,2-tetrafluoroethane and from 5% to 10% of 1,1-difluoroethane; or from 35% to 77% of 1,3,3,3-tetrafluoropropene, from 3% to 15% of 1,1-difluoroethane and from 20% to 50% of 3,3,3-trifluoropropene, preferably from 35% to 72% of 1,3,3,3-tetrafluoropropene, from 3% to 15% of 1,1-difluoroethane and from 25% to 50% of 3,3,3-trifluoropropene, and more particularly preferably from 40% to 66% of 1,3,3,3-tetrafluoropropene, from 4% to 10% of 1,1-difluoroethane and from 30% to 50% of 3,3,3-trifluoropropene.

27. A process for converting a vapor compression circuit comprising:
the provision of an initial vapor compression circuit comprising a centrifugal compressor and containing 1,1,1,2-tetrafluoroethane as heat transfer fluid; and
the replacement of the 1,1,1,2-tetrafluoroethane with a substitute heat transfer fluid in order to provide a final vapor compression circuit;
wherein the substitute heat transfer fluid comprises and preferably consists of:
from 2% to 50% of 2,3,3,3-tetrafluoropropene and from 50% to 98% of 1,1,1,2-tetrafluoroethane; or
from 50% to 95% of 2,3,3,3-tetrafluoropropene and from 5% to 50% of 1,1-difluoroethane; or
from 10% to 70% of 2,3,3,3-tetrafluoropropene and from 30% to 90% of 3,3,3-trifluoropropene; or
from 20% to 70% of 1,3,3,3-tetrafluoropropene and from 30% to 80% of 3,3,3-trifluoropropene; or
from 10% to 70% of 1,1,1,2-tetrafluoroethane and from 30% to 90% of 3,3,3-trifluoropropene; or
from 10% to 90% of 2,3,3,3-tetrafluoropropene, from 5% to 70% of 1,3,3,3-tetrafluoropropene and from 5% to 30% of 1,1-difluoroethane; or
from 10% to 93% of 2,3,3,3-tetrafluoropropene, from 5% to 80% of 1,1,1,2-tetrafluoroethane and from 2% to 50% of 1,1-difluoroethane; or
from 5% to 90% of 2,3,3,3-tetrafluoropropene, from 5% to 60% of 1,1,1,2-tetrafluoroethane and from 5% to 80% of 3,3,3-trifluoropropene; or
from 10% to 89% of 2,3,3,3-tetrafluoropropene, from 3% to 20% of 1,1-difluoroethane and from 8% to 70% of 3,3,3-trifluoropropene; or
from 10% to 60% of 1,3,3,3-tetrafluoropropene, from 20% to 87% of 1,1,1,2-tetrafluoroethane and from 3% to 20% of 1,1-difluoroethane; or
from 25% to 82% of 1,3,3,3-tetrafluoropropene, from 3% to 15% of 1,1-difluoroethane and from 15% to 60% of 3,3,3-trifluoropropene.

28. The process as recited in embodiment 27, wherein the substitute heat transfer fluid comprises:
from 2% to 30% of 2,3,3,3-tetrafluoropropene and from 70% to 98% of 1,1,1,2-tetrafluoroethane, preferably from 5% to 15% of 2,3,3,3-tetrafluoropropene and from 85% to 95% of 1,1,1,2-tetrafluoroethane; or
from 5% to 40% of 2,3,3,3-tetrafluoropropene and from 60% to 95% of 1,1,1,2-tetrafluoroethane preferably from 5% to 30% of 2,3,3,3-tetrafluoropropene and from 70% to 95% of 1,1,1,2-tetrafluoroethane; or
from 60% to 90% of 2,3,3,3-tetrafluoropropene and from 10% to 40% of 1,1-difluoroethane, preferably from 70% to 80% of 2,3,3,3-tetrafluoropropene and from 20% to 30% of 1,1-difluoroethane; or
from 60% to 95% of 2,3,3,3-tetrafluoropropene and from 5% to 40% of 1,1-difluoroethane, preferably from 85% to 90% of 2,3,3,3-tetrafluoropropene and from 10% to 15% of 1,1-difluoroethane; or from 10% to 30% of 2,3,3,3-tetrafluoropropene and from 70% to 90% of 3,3,3-trifluoropropene, preferably from 10% to 20% of 2,3,3,3-tetrafluoropropene and from 80% to 90% of 3,3,3-trifluoropropene; or from 20% to 60% of 2,3,3,3-tetrafluoropropene and from 40% to 80% of 3,3,3-trifluoropropene, preferably from 40% to 50% of 2,3,3,3-tetrafluoropropene and from 50% to 60% of 3,3,3-trifluoropropene; or from 30% to 60% of 1,3,3,3-tetrafluoropropene and from 40% to 70% of 3,3,3-trifluoropropene, preferably from 30% to 50% of 1,3,3,3-tetrafluoropropene and from 50% to 70% of 3,3,3-trifluoropropene; or from 20% to 60% of 1,1,1,2-tetrafluoroethane and from 40% to 80% of 3,3,3-trifluoropropene, preferably from 35% to 50% of 1,1,1,2-tetrafluoroethane and from 50% to 65% of 3,3,3-trifluoropropene; or from 20% to 85% of 2,3,3,3-tetrafluoropropene, from 5% to 50% of 1,3,3,3-tetrafluoropropene and from 10% to 30% of 1,1-difluoroethane, preferably from 35% to 80% of 2,3,3,3-tetrafluoropropene, from 5% to 40% of 1,3,3,3-tetrafluoropropene and from 15% to 25% of 1,1-difluoroethane; or from 20% to 85% of 2,3,3,3-tetrafluoropropene, from 5% to 60% of 1,3,3,3-tetrafluoropropene and from 10% to 20% of 1,1-difluoroethane, preferably from 30% to 85% of 2,3,3,3-tetrafluoropropene, from 5% to 50% of 1,3,3,3-tetrafluoropropene and from 10% to 15% of 1,1-difluoroethane; or from 20% to 93% of 2,3,3,3-tetrafluoropropene, from 5% to 60% of 1,1,1,2-tetrafluoroethane and from 2% to 30% of 1,1-difluoroethane, preferably from 30% to 88% of 2,3,3,3-tetrafluoropropene, from 5% to 60% of 1,1,1,2-tetrafluoroethane and from 7% to 20% of 1,1-difluoroethane; or from 13% to 93% of 2,3,3,3-tetrafluoropropene, from 5% to 60% of 1,1,1,2-tetrafluoroethane and from 2% to 30% of 1,1-difluoroethane, preferably from 25% to 92% of 2,3,3,3-tetrafluoropropene, from 5% to 60% of 1,1,1,2-tetrafluoroethane and from 3% to 15% of 1,1-difluoroethane; or from 10% to 75% of 2,3,3,3-tetrafluoropropene, from 5% to 60% of 1,1,1,2-tetrafluoroethane and from 20% to 80% of 3,3,3-trifluoropropene, preferably from 10% to 65% of 2,3,3,3-tetrafluoropropene, from 5% to 50% of 1,1,1,2-tetrafluoroethane, from 5% to 50% of 1,3,3,3-tetrafluoropropene and from 30% to 80% of 3,3,3-trifluoropropene; or from 10% to 85% of 2,3,3,3-tetrafluoropropene, from 5% to 60% of 1,1,1,2-tetrafluoroethane and from 10% to 70% of 3,3,3-trifluoropropene, preferably from 10% to 60% of 2,3,3,3-tetrafluoropropene, from 5% to 50% of 1,1,1,2-tetrafluoroethane and from 20% to 60% of 3,3,3-trifluoropropene; or from 15% to 67% of 2,3,3,3-tetrafluoropropene, from 3% to 10% of 1,1-difluoroethane and from 30% to 70% of 3,3,3-trifluoropropene, preferably from 21% to 57% of 2,3,3,3-tetrafluoropropene, from 3% to 9% of 1,1-difluoroethane and from 40% to 70% of 3,3,3-trifluoropropene; or from 35% to 89% of 2,3,3,3-tetrafluoropropene, from 3% to 15% of 1,1-difluoroethane and from 8% to 50% of 3,3,3-trifluoropropene, preferably from 50% to 85% of 2,3,3,3-tetrafluoropropene, from 5% to 10% of 1,1-difluoroethane and from 10% to 40% of 3,3,3-trifluoropropene; or from 15% to 50% of 1,3,3,3-tetrafluoropropene, from 35% to 82% of 1,1,1,2-tetrafluoroethane and from 3% to 15% of 1,1-difluoroethane, preferably from 20% to 30% of 1,3,3,3-tetrafluoropropene, from 60% to 75% of 1,1,1,2-tetrafluoroethane and from 5% to 10% of 1,1-difluoroethane; or from 10% to 40% of 1,3,3,3-tetrafluoropropene, from 45% to 87% of 1,1,1,2-tetrafluoroethane and from 3% to 15% of 1,1-difluoroethane, preferably from 10% to 30% of 1,3,3,3-tetrafluoropropene, from 60% to 85% of 1,1,1,2-tetrafluoroethane and from 5% to 10% of 1,1-difluoroethane; or from 35% to 72% of 1,3,3,3-tetrafluoropropene, from 3% to 15% of 1,1-difluoroethane and from 25% to 50% of 3,3,3-trifluoropropene, preferably from 40% to 66% of 1,3,3,3-tetrafluoropropene, from 4% to 10% of 1,1-difluoroethane and from 30% to 50% of 3,3,3-trifluoropropene; or from 35% to 82% of 1,3,3,3-tetrafluoropropene, from 3% to 15% of 1,1-difluoroethane and from 15% to 50% of 3,3,3-trifluoropropene, preferably from 40% to 75% of 1,3,3,3-tetrafluoropropene, from 5% to 10% of 1,1-difluoroethane and from 20% to 50% of 3,3,3-trifluoropropene.

29. A composition comprising:
from 10% to 90% of 2,3,3,3-tetrafluoropropene, from 5% to 70% of 1,3,3,3-tetrafluoropropene and from 5% to 30% of 1,1-difluoroethane; or from 5% to 90% of 2,3,3,3-tetrafluoropropene, from 5% to 60% of 1,1,1,2-tetrafluoroethane and from 5% to 80% of 3,3,3-trifluoropropene; or from 10% to 89% of 2,3,3,3-tetrafluoropropene, from 3% to 20% of 1,1-difluoroethane and from 8% to 70% of 3,3,3-trifluoropropene.

30. The composition as recited in embodiment 29, comprising:
from 20% to 85% of 2,3,3,3-tetrafluoropropene, from 5% to 50% of 1,3,3,3-tetrafluoropropene and from 10% to 30% of 1,1-difluoroethane, preferably from 35% to 80% of 2,3,3,3-tetrafluoropropene, from 5% to 40% of 1,3,3,3-tetrafluoropropene and from 15% to 25% of 1,1-difluoroethane; or from 20% to 85% of 2,3,3,3-tetrafluoropropene, from 5% to 60% of 1,3,3,3-tetrafluoropropene and from 10% to 20% of 1,1-difluoroethane, preferably from 30% to 85% of 2,3,3,3-tetrafluoropropene, from 5% to 50% of 1,3,3,3-tetrafluoropropene and from 10% to 15% of 1,1-difluoroethane; or from 10% to 75% of 2,3,3,3-tetrafluoropropene, from 5% to 60% of 1,1,1,2-tetrafluoroethane and from 20% to 80% of 3,3,3-trifluoropropene, preferably from 10% to 66% of 2,3,3,3-tetrafluoropropene from 5% to 50% of 1,1,1,2-tetrafluoroethane and from 30% to 80% of 3,3,3-trifluoropropene; or from 10% to 85% of 2,3,3,3-tetrafluoropropene, from 5% to 60% of 1,1,1,2-tetrafluoroethane and from 10% to 70% of 3,3,3-trifluoropropene, preferably from 10% to 60% of 2,3,3,3-tetrafluoropropene, from 5% to 50% of 1,1,1,2-tetrafluoroethane and from 20% to 60% of 3,3,3-trifluoropropene; or from 15% to 67% of 2,3,3,3-tetrafluoropropene, from 3% to 10% of 1,1-difluoroethane and from 30% to 70% of 3,3,3-trifluoropropene, preferably from 21% to 57% of 2,3,3,3-tetrafluoropropene, from 3% to 9% of 1,1-difluoroethane and from 40% to 70% of 3,3,3-trifluoropropene; or from 35% to 89% of 2,3,3,3-tetrafluoropropene, from 3% to 15% of 1,1-difluoroethane and from 8% to 50% of 3,3,3-trifluoropropene, preferably from 50% to 85% of 2,3,3,3-tetrafluoroethane, from 5% to 10% of 1,1-difluoroethane and from 10% to 40% of 3,3,3-trifluoropropene.

31. A heat transfer composition, comprising the composition as recited in embodiment 29 or 30, and also one or more additives chosen from lubricants, stabilizers, surfactants, tracers, fluorescent agents, odorous agents, solubilization agents and mixtures thereof.

The invention claimed is:

1. A process for converting a vapor compression circuit comprising a centrifugal compressor containing 1,1,1,2-tetrafluoroethane as heat transfer fluid, the method comprising:
removing said 1,1,1,2-tetrafluoroethane from said vapor compression circuit; and
adding a substitute heat transfer fluid comprising at least two compounds selected from a group consisting of 2,3,3,3-tetrafluoropropene, 1,3,3,3-tetrafluoropropene, 1,1,1,2-tetrafluoroethane, and 1,1-difluoroethane,
wherein:
a ratio of the Mach number of the centrifugal compressor containing said substitute heat transfer fluid to the Mach number of the centrifugal compressor containing said 1,1,1,2-tetrafluoroethane, under the same operating conditions, is greater than or equal to 0.97 and less than or equal to 1.03;
a compression ratio of the centrifugal compressor containing said substitute heat transfer fluid is less than or equal to the compression ratio of the centrifugal compressor containing said 1,1,1,2-tetrafluoroethane, under the same operating conditions; and
the centrifugal compressor is devoid of rotational speed adaptation means.

2. The process as claimed in claim 1, wherein the substitute heat transfer fluid comprises a mixture selected from the group consisting of:
2,3,3,3-tetrafluoropropene and 1,1,1,2-tetrafluoroethane;
2,3,3,3-tetrafluoropropene, 1,1,1,2-tetrafluoroethane and 1,1-difluoroethane; and
1,3,3,3-tetrafluoropropene, 1,1,1,2-tetrafluoroethane and 1,1-difluoroethane.

3. The process as claimed in claim 1, wherein the vapor compression circuit comprises an evaporator and a condenser, and wherein:
a difference between the pressure at the condenser and the pressure at the evaporator in the final vapor compression circuit containing said substitute heat transfer fluid is less than or equal to the difference between the pressure at the condenser and the pressure at the evaporator in the vapor compression circuit containing said 1,1,1,2-tetrafluoroethane, under the same operating conditions.

4. The process as claimed in claim 1, wherein the substitute heat transfer fluid comprises a mixture selected from the group consisting of:
from 2% to 50% of 2,3,3,3-tetrafluoropropene and from 50% to 98% of 1,1,1,2-tetrafluoroethane;
from 10% to 93% of 2,3,3,3-tetrafluoropropene, from 5% to 80% of 1,1,1,2-tetrafluoroethane and from 2% to 50% of 1,1-difluoroethane; and
from 10% to 60% of 1,3,3,3-tetrafluoropropene, from 20% to 87% of 1,1,1,2-tetrafluoroethane and from 3% to 20% of 1,1-difluoroethane.

5. The process as claimed in claim 1, wherein the substitute heat transfer fluid comprises a mixture selected from the group consisting of:
from 2% to 50% of 2,3,3,3-tetrafluoropropene and from 50% to 98% of 1,1,1,2-tetrafluoroethane;
from 15% to 85% of 2,3,3,3-tetrafluoropropene, from 5% to 60% of 1,3,3,3-tetrafluoropropene and from 5% to 30% of 1,1-difluoroethane;
from 18% to 93% of 2,3,3,3-tetrafluoropropene, from 5% to 80% of 1,1,1,2-tetrafluoroethane and from 2% to 50% of 1,1-difluoroethane; and
from 15% to 60% of 1,3,3,3-tetrafluoropropene, from 20% to 82% of 1,1,1,2-tetrafluoroethane and from 3% to 20% of 1,1-difluoroethane.

6. The process as claimed in claim 1, wherein the substitute heat transfer fluid comprises, a mixture selected from the group consisting of:
a mixture consisting of 2,3,3,3-tetrafluoropropene and 1,1,1,2-tetrafluoroethane;
a mixture consisting of 2,3,3,3-tetrafluoropropene, 1,1,1,2-tetrafluoroethane and 1,1-difluoroethane; and
a mixture consisting of 1,3,3,3-tetrafluoropropene, 1,1,1,2-tetrafluoroethane and 1,1-difluoroethane.

7. The process as claimed in claim 1, wherein the substitute heat transfer fluid comprises a mixture consisting of 2,3,3,3-tetrafluoropropene and 1,1,1,2-tetrafluoroethane.

8. The process as claimed in claim 1, wherein the substitute heat transfer fluid comprises a mixture consisting of 2,3,3,3-tetrafluoropropene, 1,1,1,2-tetrafluoroethane and 1,1-difluoroethane.

9. The process as claimed in claim 1, wherein the substitute heat transfer fluid comprises a mixture consisting of 1,3,3,3-tetrafluoropropene, 1,1,1,2-tetrafluoroethane and 1,1-difluoroethane.

10. A process for converting a vapor compression circuit comprising a centrifugal compressor containing 1,1,1,2-tetrafluoroethane as heat transfer fluid comprising:
removing said 1,1,1,2-tetrafluoroethane from said vapor compression circuit; and
adding a substitute heat transfer fluid comprising a mixture selected from the group consisting of:
a mixture consisting of from 2% to 50% of 2,3,3,3-tetrafluoropropene and from 50% to 98% of 1,1,1,2-tetrafluoroethane;
a mixture consisting of from 18% to 93% of 2,3,3,3-tetrafluoropropene, from 5% to 80% of 1,1,1,2-tetrafluoroethane and from 2% to 50% of 1,1-difluoroethane; and
a mixture consisting of from 15% to 60% of 1,3,3,3-tetrafluoropropene, from 20% to 82% of 1,1,1,2-tetrafluoroethane and from 3% to 20% of 1,1-difluoroethane.

11. The process as claimed in claim 10, wherein the substitute heat transfer fluid comprises a mixture selected from the group consisting of:
a mixture consisting of from 2% to 30% of 2,3,3,3-tetrafluoropropene and from 70% to 98% of 1,1,1,2-tetrafluoroethane;
a mixture consisting of from 5% to 40% of 2,3,3,3-tetrafluoropropene and from 60% to 95% of 1,1,1,2-tetrafluoroethane;
a mixture consisting of from 20% to 93% of 2,3,3,3-tetrafluoropropene, from 5% to 60% of 1,1,1,2-tetrafluoroethane and from 2% to 30% of 1,1-difluoroethane;

a mixture consisting of from 13% to 93% of 2,3,3,3-tetrafluoropropene, from 5% to 60% of 1,1,1,2-tetrafluoroethane and from 2% to 30% of 1,1-difluoroethane;

a mixture consisting of from 15% to 50% of 1,3,3,3-tetrafluoropropene, from 35% to 82% of 1,1,1,2-tetrafluoroethane and from 3% to 15% of 1,1-difluoroethane; and a mixture consisting of from 10% to 40% of 1,3,3,3-tetrafluoropropene, from 45% to 87% of 1,1,1,2-tetrafluoroethane and from 3% to 15% of 1,1-difluoroethane.

12. The process as claimed in claim 10, wherein the substitute heat transfer fluid comprises a mixture consisting of from 2% to 50% of 2,3,3,3-tetrafluoropropene and from 50% to 98% of 1,1,1,2-tetrafluoroethane.

13. The process as claimed in claim 10, wherein the substitute heat transfer fluid comprises a mixture consisting off from 18% to 93% of 2,3,3,3-tetrafluoropropene, from 5% to 80% of 1,1,1,2-tetrafluoroethane and from 2% to 50% of 1,1-difluoroethane.

14. The process as claimed in claim 10, wherein the substitute heat transfer fluid comprises a mixture consisting of from 15% to 60% of 1,3,3,3-tetrafluoropropene, from 20% to 82% of 1,1,1,2-tetrafluoroethane and from 3% to 20% of 1,1-difluoroethane.

\* \* \* \* \*